(12) United States Patent
Schmid et al.

(10) Patent No.: US 11,747,561 B2
(45) Date of Patent: Sep. 5, 2023

(54) SLICED GRATING COUPLER WITH INCREASED BEAM ALIGNMENT SENSITIVITY

(71) Applicant: Quantum-Si Incorporated, Guilford, CT (US)

(72) Inventors: Gerard Schmid, Guilford, CT (US); Kyle Preston, Guilford, CT (US); Shannon Stewman, Guilford, CT (US)

(73) Assignee: Quantum-Si Incorporated, Branford, CT (US)

( * ) Notice: Subject to any disclaimer, the term of this patent is extended or adjusted under 35 U.S.C. 154(b) by 364 days.

(21) Appl. No.: 16/861,399

(22) Filed: Apr. 29, 2020

(65) Prior Publication Data
US 2020/0393616 A1 Dec. 17, 2020

Related U.S. Application Data

(60) Provisional application No. 62/861,832, filed on Jun. 14, 2019.

(51) Int. Cl.
*G02B 6/124* (2006.01)
*G01N 21/64* (2006.01)
*G02B 6/12* (2006.01)

(52) U.S. Cl.
CPC ......... *G02B 6/124* (2013.01); *G01N 21/6428* (2013.01); *G02B 6/12004* (2013.01); *G01N 2021/6439* (2013.01); *G02B 2006/12107* (2013.01)

(58) Field of Classification Search
None
See application file for complete search history.

(56) References Cited

U.S. PATENT DOCUMENTS

| | | | |
|---|---|---|---|
| 4,034,949 A | 7/1977 | Hoesterey et al. |
| 4,118,109 A | 10/1978 | Crawford et al. |
| 4,295,226 A | 10/1981 | Dombrowski |
| 4,850,686 A | 7/1989 | Morimoto et al. |
| 5,108,179 A | 4/1992 | Myers |
| 5,196,709 A | 3/1993 | Berndt et al. |
| 5,471,515 A | 11/1995 | Fossum et al. |
| 5,627,853 A | 5/1997 | Mooradian et al. |
| 5,674,743 A | 10/1997 | Ulmer |

(Continued)

FOREIGN PATENT DOCUMENTS

| | | |
|---|---|---|
| CN | 1242884 A | 1/2000 |
| CN | 101387750 A | 3/2009 |

(Continued)

OTHER PUBLICATIONS

Invitation to Pay Additional Fees for International Application No. PCT/US2020/030345 dated Aug. 13, 2020.

(Continued)

*Primary Examiner* — Omar R Rojas
(74) *Attorney, Agent, or Firm* — Wolf, Greenfield & Sacks, P.C.

(57) ABSTRACT

Apparatus and methods relating to coupling radiation from an incident beam into a plurality of waveguides with a grating coupler are described. A grating coupler can have offset receiving regions and grating portions with offset periodicity to improve sensitivity of the grating coupler to misalignment of the incident beam.

18 Claims, 14 Drawing Sheets

(56) References Cited

U.S. PATENT DOCUMENTS

| | | | |
|---|---|---|---|
| 5,822,472 A | 10/1998 | Danielzik et al. | |
| 5,854,651 A | 12/1998 | Kessler et al. | |
| 5,961,924 A | 10/1999 | Reichert et al. | |
| 6,175,670 B1* | 1/2001 | Bergmann | G02B 6/1228 385/47 |
| 6,185,235 B1 | 2/2001 | Cheng et al. | |
| 6,205,266 B1 | 3/2001 | Palen et al. | |
| 6,355,420 B1 | 3/2002 | Chan | |
| 6,393,035 B1 | 5/2002 | Weingarten et al. | |
| 6,437,345 B1 | 8/2002 | Bruno-Raimondi et al. | |
| 6,473,250 B1 | 10/2002 | Chapman et al. | |
| 6,545,759 B1* | 4/2003 | Hartman | G01N 21/7703 356/477 |
| 6,618,423 B1 | 9/2003 | Dekorsky et al. | |
| 6,628,850 B1* | 9/2003 | Yao | H04B 10/5051 385/10 |
| 6,715,685 B2 | 4/2004 | Dvorkis | |
| 6,716,394 B2 | 4/2004 | Jensen et al. | |
| 6,787,308 B2 | 9/2004 | Balasubramanian et al. | |
| 6,825,921 B1 | 11/2004 | Modlin et al. | |
| 6,834,064 B1 | 12/2004 | Paschotta et al. | |
| 6,847,450 B2 | 1/2005 | Richard et al. | |
| 6,917,726 B2 | 7/2005 | Levene et al. | |
| 7,052,847 B2 | 5/2006 | Korlach et al. | |
| 7,170,050 B2 | 1/2007 | Turner et al. | |
| 7,175,811 B2 | 2/2007 | Bach et al. | |
| 7,179,654 B2 | 2/2007 | Verdonk et al. | |
| 7,394,841 B1 | 7/2008 | Konttinen et al. | |
| 7,426,322 B2 | 9/2008 | Hyde | |
| 7,595,883 B1 | 9/2009 | El Gamal et al. | |
| 7,738,086 B2 | 6/2010 | Shepard et al. | |
| 7,742,510 B2 | 6/2010 | Essaian et al. | |
| 7,820,983 B2 | 10/2010 | Lundquist et al. | |
| 7,834,329 B2 | 11/2010 | Lundquist et al. | |
| 7,838,847 B2 | 11/2010 | Lundquist et al. | |
| 7,873,085 B2 | 1/2011 | Babushkin et al. | |
| 7,968,702 B2 | 6/2011 | Wegener et al. | |
| 7,981,604 B2 | 7/2011 | Quake | |
| 8,053,742 B2 | 11/2011 | Lundquist et al. | |
| 8,207,509 B2 | 6/2012 | Lundquist et al. | |
| 8,252,911 B2 | 8/2012 | Bjornson et al. | |
| 8,274,040 B2 | 9/2012 | Zhong et al. | |
| 8,278,728 B2 | 10/2012 | Murshid | |
| 8,279,901 B2 | 10/2012 | Karavitis | |
| 8,465,699 B2 | 6/2013 | Fehr et al. | |
| 8,471,219 B2 | 6/2013 | Lundquist et al. | |
| 8,471,230 B2 | 6/2013 | Zhong et al. | |
| 8,501,406 B1 | 8/2013 | Gray et al. | |
| 8,502,169 B2 | 8/2013 | Rigneault et al. | |
| 8,618,507 B1 | 12/2013 | Lundquist et al. | |
| 8,865,077 B2 | 10/2014 | Chiou et al. | |
| 8,953,651 B2 | 2/2015 | Karavitis | |
| 9,029,802 B2 | 5/2015 | Lundquist et al. | |
| 9,054,479 B2 | 6/2015 | Karavitis | |
| 9,157,864 B2 | 10/2015 | Fehr et al. | |
| 9,222,123 B2 | 12/2015 | Zhong et al. | |
| 9,222,133 B2 | 12/2015 | Lundquist et al. | |
| 9,223,084 B2 | 12/2015 | Grot et al. | |
| 9,318,867 B2 | 4/2016 | Pronin et al. | |
| 9,325,148 B2 | 4/2016 | Karavitis | |
| 9,372,308 B1 | 6/2016 | Saxena et al. | |
| 9,587,276 B2 | 3/2017 | Lundquist et al. | |
| 9,606,060 B2 | 3/2017 | Chen et al. | |
| 9,617,594 B2* | 4/2017 | Rothberg | C12Q 1/6869 |
| 9,658,161 B2 | 5/2017 | Saxena et al. | |
| 9,666,748 B2 | 5/2017 | Leobandung | |
| 9,719,138 B2 | 8/2017 | Zhong et al. | |
| 9,765,395 B2 | 9/2017 | Goldsmith | |
| 9,946,017 B2 | 4/2018 | Saxena et al. | |
| 10,018,764 B2 | 7/2018 | Grot et al. | |
| 10,090,429 B2 | 10/2018 | Leobandung | |
| 10,138,515 B2 | 11/2018 | Fehr et al. | |
| 10,246,742 B2 | 4/2019 | Rothberg et al. | |
| 10,280,457 B2 | 5/2019 | Zhong et al. | |
| 10,283,928 B2 | 5/2019 | Rothberg et al. | |
| 10,310,178 B2 | 6/2019 | Saxena et al. | |
| 10,487,356 B2 | 11/2019 | Lundquist et al. | |
| 10,551,624 B2 | 2/2020 | Rothberg et al. | |
| 10,578,788 B2 | 3/2020 | Grot et al. | |
| 10,605,730 B2 | 3/2020 | Rothberg et al. | |
| 10,655,172 B2 | 5/2020 | Rank et al. | |
| 10,712,433 B2 | 7/2020 | Carothers | |
| 10,724,090 B2 | 7/2020 | McCaffrey et al. | |
| 10,741,990 B2 | 8/2020 | Rothberg et al. | |
| 11,249,318 B2 | 2/2022 | Rothberg et al. | |
| 11,322,906 B2 | 5/2022 | Rothberg et al. | |
| 2001/0050821 A1 | 12/2001 | Bickleder et al. | |
| 2002/0141473 A1 | 10/2002 | Cordingley et al. | |
| 2002/0182716 A1 | 12/2002 | Weisbuch et al. | |
| 2003/0058904 A1 | 3/2003 | Krainer et al. | |
| 2003/0151053 A1 | 8/2003 | Sun et al. | |
| 2003/0169784 A1 | 9/2003 | Sutter et al. | |
| 2003/0174992 A1 | 9/2003 | Levene et al. | |
| 2003/0179786 A1 | 9/2003 | Kopf | |
| 2004/0028090 A1 | 2/2004 | Pask et al. | |
| 2004/0047387 A1 | 3/2004 | Bunting et al. | |
| 2004/0169842 A1 | 9/2004 | Dosluoglu et al. | |
| 2004/0257140 A1 | 12/2004 | Bergmann et al. | |
| 2006/0000814 A1 | 1/2006 | Gu et al. | |
| 2006/0029110 A1 | 2/2006 | Cho et al. | |
| 2006/0269190 A1 | 11/2006 | Kim et al. | |
| 2008/0130099 A1 | 6/2008 | Harter | |
| 2009/0180500 A1 | 7/2009 | Babushkin et al. | |
| 2009/0225799 A1 | 9/2009 | Hasegawa | |
| 2010/0021180 A1 | 1/2010 | Uemura et al. | |
| 2010/0065726 A1 | 3/2010 | Zhong et al. | |
| 2010/0173394 A1 | 7/2010 | Colston et al. | |
| 2010/0245354 A1 | 9/2010 | Rousso et al. | |
| 2010/0254022 A1 | 10/2010 | O'Shaughnessy | |
| 2010/0255487 A1 | 10/2010 | Beechem et al. | |
| 2010/0327762 A1 | 12/2010 | Yang | |
| 2011/0136201 A1 | 6/2011 | Mao et al. | |
| 2011/0165652 A1 | 7/2011 | Hardin et al. | |
| 2011/0170566 A1 | 7/2011 | Holtom | |
| 2011/0206070 A1 | 8/2011 | Karavitis | |
| 2011/0206071 A1 | 8/2011 | Karavitis | |
| 2011/0206072 A1 | 8/2011 | Karavitis | |
| 2011/0206073 A1 | 8/2011 | Karavitis | |
| 2011/0236983 A1 | 9/2011 | Beechem et al. | |
| 2012/0039345 A1 | 2/2012 | Fan et al. | |
| 2012/0081040 A1 | 4/2012 | Ku | |
| 2012/0282391 A1 | 11/2012 | Palmaz et al. | |
| 2013/0051411 A1 | 2/2013 | Kim et al. | |
| 2013/0071849 A1 | 3/2013 | Kong et al. | |
| 2013/0116153 A1 | 5/2013 | Bowen et al. | |
| 2014/0286364 A1 | 9/2014 | Pronin et al. | |
| 2015/0293021 A1 | 10/2015 | Finkelstein et al. | |
| 2015/0355469 A1 | 12/2015 | Oguri et al. | |
| 2016/0002088 A1 | 1/2016 | Mizumura et al. | |
| 2016/0084761 A1 | 3/2016 | Rothberg et al. | |
| 2016/0231549 A1 | 8/2016 | Bosworth et al. | |
| 2016/0238532 A1 | 8/2016 | Freudiger et al. | |
| 2016/0336709 A1 | 11/2016 | Manni | |
| 2016/0341664 A1 | 11/2016 | Rothberg et al. | |
| 2016/0344156 A1 | 11/2016 | Rothberg et al. | |
| 2016/0369332 A1 | 12/2016 | Rothberg et al. | |
| 2017/0146479 A1 | 5/2017 | Levine et al. | |
| 2017/0160541 A1 | 6/2017 | Carothers et al. | |
| 2018/0115136 A1 | 4/2018 | Delfyett et al. | |
| 2018/0173000 A1 | 6/2018 | Rothberg et al. | |
| 2018/0175582 A1 | 6/2018 | Rothberg et al. | |
| 2019/0249240 A1 | 8/2019 | Rothberg et al. | |
| 2019/0292590 A1 | 9/2019 | Zhong et al. | |
| 2019/0383737 A1 | 12/2019 | Rothberg et al. | |
| 2019/0391328 A1* | 12/2019 | Li | G02B 6/4274 |
| 2020/0124864 A1 | 4/2020 | Rothberg et al. | |
| 2020/0158640 A1 | 5/2020 | Rothberg et al. | |
| 2020/0220317 A1 | 7/2020 | Rothberg et al. | |
| 2020/0335933 A1 | 10/2020 | Rothberg et al. | |
| 2021/0218218 A1 | 7/2021 | Bellos et al. | |

(56) References Cited

U.S. PATENT DOCUMENTS

| | | |
|---|---|---|
| 2021/0277463 A1 | 9/2021 | Rothberg et al. |
| 2022/0209492 A1 | 6/2022 | Rothberg et al. |

FOREIGN PATENT DOCUMENTS

| | | |
|---|---|---|
| CN | 101414729 A | 4/2009 |
| CN | 101572380 A | 11/2009 |
| CN | 101636886 A | 1/2010 |
| CN | 101915752 A | 12/2010 |
| CN | 101938081 A | 1/2011 |
| CN | 102549478 A | 7/2012 |
| CN | 102789055 A | 11/2012 |
| CN | 102832536 A | 12/2012 |
| CN | 103502471 A | 1/2014 |
| CN | 103765704 A | 4/2014 |
| CN | 203774604 U | 8/2014 |
| CN | 104078839 A | 10/2014 |
| CN | 104201547 A | 12/2014 |
| CN | 104518419 A | 4/2015 |
| CN | 106029904 A | 10/2016 |
| DE | 10 2009 036273 A1 | 2/2011 |
| EP | 0472318 A2 | 2/1992 |
| EP | 0542480 A2 | 5/1993 |
| EP | 0601714 A1 | 6/1994 |
| EP | 1681356 A1 | 7/2006 |
| EP | 2182523 A1 | 5/2010 |
| EP | 3296783 A1 | 3/2018 |
| ES | 2329206 A1 | 11/2009 |
| JP | S63-17581 A | 1/1988 |
| JP | H05-243660 A | 9/1993 |
| JP | H05-275780 A | 10/1993 |
| JP | H05-283766 A | 10/1993 |
| JP | H07-221374 A | 8/1995 |
| JP | H08-506664 A | 7/1996 |
| JP | H08-340154 A | 12/1996 |
| JP | H10-3022 A | 1/1998 |
| JP | H11-505370 A | 5/1999 |
| JP | 2000-155052 A2 | 6/2000 |
| JP | 2001-25102 A | 1/2001 |
| JP | 2001-077449 A | 3/2001 |
| JP | 2001-142035 A | 5/2001 |
| JP | 2001-251002 A | 9/2001 |
| JP | 2002-239773 A | 8/2002 |
| JP | 2002-368313 A | 12/2002 |
| JP | 2003-500861 A | 1/2003 |
| JP | 2003-168840 A | 6/2003 |
| JP | 2004-520709 A | 7/2004 |
| JP | 2004-363419 A | 12/2004 |
| JP | 2005-512086 A | 4/2005 |
| JP | 2005-524051 A | 8/2005 |
| JP | 2006-48885 A | 2/2006 |
| JP | 2007-511079 A | 4/2007 |
| JP | 2007-520735 A | 7/2007 |
| JP | 2008-28379 A | 2/2008 |
| JP | 2009-122493 A | 6/2009 |
| JP | 2009-277754 A | 11/2009 |
| JP | 2010-103291 A | 5/2010 |
| JP | 2010-204006 A | 9/2010 |
| JP | 2011-119393 A | 6/2011 |
| JP | 2011-518445 A | 6/2011 |
| JP | 2012-32183 A | 2/2012 |
| JP | 2012-98299 A | 5/2012 |
| JP | 2010-074198 A | 8/2012 |
| JP | 2012-242626 A | 12/2012 |
| JP | 2013-104876 A | 5/2013 |
| JP | 2013-518302 A | 5/2013 |
| JP | 2013-520848 A | 6/2013 |
| JP | 2014-150210 A | 8/2014 |
| JP | 2014-531777 A | 11/2014 |
| JP | 2015-015337 A | 1/2015 |
| JP | 2015-501415 A | 1/2015 |
| JP | 2016-502290 A | 1/2016 |
| KR | 590565 B1 | 6/2006 |
| TW | 200909794 A | 3/2009 |
| TW | 201022719 A | 6/2010 |
| TW | 201440942 A | 11/2014 |
| WO | WO 94/18218 A1 | 8/1994 |
| WO | WO 02/11252 A2 | 2/2002 |
| WO | WO 03/021212 A1 | 3/2003 |
| WO | WO 2005/073407 A1 | 8/2005 |
| WO | WO 2008/087253 A1 | 7/2008 |
| WO | WO 2011/091316 A2 | 7/2011 |
| WO | WO 2011/153962 A1 | 12/2011 |
| WO | WO 2012/133292 A1 | 4/2012 |
| WO | WO 2014/107294 A2 | 7/2014 |
| WO | WO 2014/142981 | 9/2014 |
| WO | WO 2016/187564 A1 | 11/2016 |

OTHER PUBLICATIONS

International Search Report and Written Opinion for International Application No. PCT/US2020/030345 dated Oct. 19, 2020.
Hale, Fibre Optic Sensors using Adiabatically Tapered Single Mode Fibres. Dissertation submitted to the University of Cambridge. Feb. 1994. 209 pages.
Mogensen et al., A Microfluidic Device with an Integrated Waveguide Beam Splitter for Velocity Measurements of Flowing Particles by Fourier Transformation. Analytical Chemistry. Sep. 15, 2003;75(18):4931-4936.
Taillaert et al., Grating couplers for coupling between optical fibers and nanophotonic waveguides. Japanese Journal of Applied Physics. 2006;45(8A):6071-7.
Taitt et al., Evanescent wave fluorescence biosensors. Biosens Bioelectron. Jun. 2005;20(12):2470-87. Epub Dec. 8, 2004.
International Search Report and Written Opinion for International Application No. PCT/US2017/066348 dated May 4, 2018.
Invitation to Pay Additional Fees for International Application No. PCT/US2017/066348 dated Mar. 8, 2018.
Stultz et al., Short pulse, high-repetition rate, passively Q-switched Er:yttrium-aluminum-garnet laser at 1.6 microns. Applied Physics Letters. Dec. 12, 2005;87(24):241118.
U.S. Appl. No. 15/161,088, filed May 20, 2016, Rothberg et al.
U.S. Appl. No. 15/255,624, filed Sep. 2, 2016, Rothberg et al.
U.S. Appl. No. 16/277,113, filed Feb. 15, 2019, Rothberg et al.
U.S. Appl. No. 15/161,067, filed May 20, 2016, Rothberg et al.
U.S. Appl. No. 16/751,135, filed Jan. 23, 2020, Rothberg et al.
U.S. Appl. No. 15/842,720, filed Dec. 14, 2017, Rothberg et al.
U.S. Appl. No. 16/721,611, filed Dec. 19, 2019, Rothberg et al.
U.S. Appl. No. 15/844,469, filed Dec. 15, 2017, Rothberg et al.
U.S. Appl. No. 16/362,830, filed Mar. 25, 2019, Rothberg et al.
U.S. Appl. No. 16/916,277, filed Jun. 30, 2020, Rothberg et al.
U.S. Appl. No. 16/442,206, filed Jun. 14, 2019, Rothberg et al.
PCT/US2017/066348, Mar. 8, 2018, Invitation to Pay Additional Fees.
PCT/US2017/066348, May 4, 2018, International Search Report and Written Opinion.
Invitation to Pay Additional Fees for International Application No. PCT/US2016/033576 dated Aug. 24, 2016.
International Search Report and Written Opinion for International Application No. PCT/US2016/033576 dated Nov. 4, 2016.
International Preliminary Report on Patentability for International Application No. PCT/US2016/033576 dated Nov. 30, 2017.
Invitation to Pay Additional Fees for International Application No. PCT/US2016/033585 dated Sep. 21, 2016.
International Search Report and Written Opinion for International Application No. PCT/US2016/033585 dated Nov. 11, 2016.
International Preliminary Report on Patentability for International Application No. PCT/US2016/033585 dated Nov. 30, 2017.
International Preliminary Report on Patentability for International Application No. PCT/US2017/066348 dated Jun. 27, 2019.
International Search Report and Written Opinion for International Application No. PCT/US2017/066878 dated Mar. 15, 2018.
International Preliminary Report on Patentability for International Application No. PCT/US2017/066878 dated Jun. 27, 2019.
Invitation to Pay Additional Fees for International Application No. PCT/US2019/037354 dated Sep. 25, 2019.
International Search Report and Written Opinion for International Application No. PCT/US2019/037354 dated Nov. 19, 2019.

(56) References Cited

OTHER PUBLICATIONS

International Preliminary Report on Patentability for International Application No. PCT/US2019/037354 dated Dec. 24, 2020.
Invitation to Pay Additional Fees for International Application No. PCT/US2021/013320 dated May 10, 2021.
International Search Report and Written Opinion for International Application No. PCT/US2021/013320 dated Jul. 1, 2021.
[No Author Listed] Semiconductor Components Industries, LLC, MC10EP05, MC100EP05. 3.3V/5V ECL 2-input differential and/nand. Aug. 2008. 11 Pages.
Araki et al., An ultraviolet nanosecond light pulse generator using a light emiting diode for test of photodetectors. Rev. Sci. Instr. Mar. 1997;68:1364-8.
Binh et al., A simple sub-nanosecond ultraviolet light pulse generator with high repetition rate and peak power. Rev. Sci. Instr. 2013;84:083102.1-083102.5.
Champak et al., Ultrafast pulse generation in a mode-locked Erbium chip waveguide laser. Opt. Express 24. 2016. 8 pages.
Huang et al., Gene expression analysis with an integrated CMOS microarray by time-resolved fluorescence detection. Biosensors and Bioelectronics. 2012;26(5):2660-5.
Huang et al., Slab-coupled Optical Waveguide Lasers Emerge from a Multimode Sea. www.photonics.com, Oct. 2006. 10 Pages.
Kwon et al., Ultrashort stretched-pulse L-band laser using carbon-nanotube saturable absorber. Opt. Express 23, 7779-7785. 2015.
Lu et al., Terahertz Microchip for Illicit Drug Detection. IEEE Photonics Technology Letters. 2006;18(21):2254-6.
Pfeufer et al., A ddT ddA ddG ddC Length-sorted strands fow through a capillary Detector Final output Focused laser beam Fluorescence Fluorescently teminated oligonucleotides Original DNA strand Genetics/DNA Sequencing. 2015;24-7.
Sauer et al., Time-Resolved Identification of Individual Mononucleotide Molecules in Aqueous Solution with Pulsed Semiconductor Lasers. Bioimaging, Institute of Physics. 1998;6(1):14-24.
Uhring et al., A low-cost high-repetition-rate picosecond laser diode pulse generator. Optical Sensing II. 2004;5452:583-90.
Villafana-Rauda et al., Dynamics of a Q-switched Nd: YVO4/Cr: YAG laser under periodic modulation. Results in Physics. Mar. 1, 2019;12:908-13.
Zhang et al., Square-wave pulse with ultra-wide tuning range in a passively mode-locked fiber laser. Optics letters. Apr. 15, 2012;37(8):1334-6.
International Preliminary Report on Patentability for International Application No. PCT/US2020/030345 dated Dec. 23, 2021.

\* cited by examiner

SLICED GRATING COUPLER WITH INCREASED BEAM ALIGNMENT SENSITIVITY

RELATED APPLICATIONS

This Application is a Non-Prov of Prov (35 USC 119(e)) of U.S. Application Ser. No. 62/861,832, filed Jun. 14, 2019, entitled "SLICED GRATING COUPLER WITH INCREASED BEAM ALIGNMENT SENSITIVITY".

FIELD

The present application relates to coupling radiation into multiple optical waveguides with one or more gratings.

RELATED ART

In the area of optical instrumentation and integrated optical devices, optical radiation may be delivered to a plurality of discrete sites on a chip. For communication devices or analytic devices, the optical radiation may be delivered to a plurality of waveguides formed on a chip that can transport the optical radiation to one or more sites on the chip (e.g., for signal processing or for sample probing). One approach to delivering the radiation to multiple sites is to couple the radiation from an incident beam into a plurality of waveguides using one or more grating couplers.

SUMMARY

Apparatus and methods relating to coupling optical radiation into one or more waveguides formed on a substrate are described. In some embodiments, a grating coupler is patterned to have offset or staggered inlets to two or more waveguides, such that the offsetting of inlets provides signals from the waveguides that disambiguate motion of an optical beam on the grating coupler in a direction toward or away from the inlets. In some embodiments, a grating coupler is patterned to have regions of different grating periodicity adjacent to inlets to two or more waveguides, such that the varied periodicity provides signals from the waveguides that disambiguate changes in incident angle of an optical beam on the grating coupler. In further embodiments, the offsetting of inlets and varied pitch can be combined in a grating coupler to disambiguate both motion of and changes in incident angle of an optical beam on the grating coupler. Disambiguation of beam motion and incident angle can improve the grating coupler's sensitivity to alignment and misalignment of the incident beam.

Some embodiments relate to an integrated device comprising a grating disposed on a substrate and arranged to couple radiation incident on the grating into a plurality of optical waveguides disposed on the substrate; a first inlet to a first receiving region of the plurality of optical waveguides; and a second inlet to a second receiving region of the plurality of optical waveguides, wherein the second inlet is offset a first amount with respect to the first inlet in a first direction perpendicular to lines of the grating.

Some embodiments relate to a method of coupling radiation into a plurality of optical waveguides formed on a substrate, the method comprising acts of receiving one or more beams of radiation on a grating formed on the substrate; coupling the radiation from the one or more beams into a plurality of receiving regions connected to the plurality of optical waveguides; monitoring a first amount of radiation received from a first waveguide of the plurality of optical waveguides; and determining whether the one or more beams move toward or away from an inlet of the first waveguide in a direction perpendicular to lines of the grating based, at least in part, upon the monitored amount of radiation.

Some embodiments relate to a method of making an integrated device. The method may comprise acts of forming a plurality of waveguides on a substrate; forming a grating on the substrate that spans inlets to the plurality of waveguides; locating a first inlet to a first waveguide of the plurality of waveguides along a reference line for the grating; and offsetting a second inlet to a second waveguide of the plurality of waveguides by a first distance from the reference line, wherein the first distance is in a first direction perpendicular to lines of the grating.

Some embodiments relate to an integrated device comprising a grating disposed on a substrate and arranged to couple radiation incident on the grating into a plurality of optical waveguides disposed on the substrate; a first inlet to a first waveguide of the plurality of optical waveguides; and a second inlet to a second waveguide of the plurality of optical waveguides, wherein a first portion of the grating located adjacent to the first inlet has a different periodicity than a second portion of the grating located adjacent to the second inlet.

Some embodiments relate to a method of coupling radiation into a plurality of optical waveguides formed on a substrate, the method comprising acts of receiving one or more beams of radiation on a grating; coupling radiation from the one or more beams into a plurality of optical waveguides; monitoring a signal received from a first waveguide of the plurality of optical waveguides; and determining whether an incident pitch angle of the one or more beams on the grating changes in a direction perpendicular to lines of the grating based, at least in part, upon the signal monitored from the first waveguide.

Some embodiments relate to a method of making an integrated device. The method may comprise acts of forming a plurality of waveguides on a substrate, each waveguide having an inlet adjacent to a grating; and forming the grating on the substrate to span the inlets to the plurality of waveguides, wherein a first portion of the grating located adjacent to a first inlet to a first waveguide of the plurality of waveguides has a different periodicity than a second portion of the grating located adjacent to a second inlet to a second waveguide of the plurality of waveguides.

The foregoing and other aspects, implementations, acts, functionalities, features and, embodiments of the present teachings can be more fully understood from the following description in conjunction with the accompanying drawings.

BRIEF DESCRIPTION OF THE DRAWINGS

The skilled artisan will understand that the figures, described herein, are for illustration purposes only. It is to be understood that in some instances various aspects of the invention may be shown exaggerated or enlarged to facilitate an understanding of the invention. In the drawings, like reference characters generally refer to like features, functionally similar and/or structurally similar elements throughout the various figures. The drawings are not necessarily to scale, emphasis instead being placed upon illustrating the principles of the teachings. The drawings are not intended to limit the scope of the present teachings in any way.

FIG. 1-2 is a plan view depicting an example of a grating coupler arranged to couple optical radiation into a plurality of waveguides, according to some embodiments.

FIG. 1-3 is an elevation view of a grating coupler, according to some embodiments.

FIG. 2-1 is a plan view of an example grating coupler with improved sensitivity to beam alignment, according to some embodiments.

FIG. 2-2 is a plan view of an example grating coupler with improved sensitivity to beam alignment, according to some embodiments.

FIG. 2-3 is a plan view of an example grating coupler with improved sensitivity to beam alignment for a plurality of incident beams, according to some embodiments.

FIG. 2-4 depicts signal characteristics for signals received from receiving regions of a grating coupler having improved sensitivity to beam alignment, according to some embodiments.

FIG. 3-1 is a plan view of an example grating coupler with improved sensitivity to beam alignment, according to some embodiments.

FIG. 3-2 is a plan view of an example grating coupler with improved sensitivity to beam alignment, according to some embodiments.

FIG. 3-3 depicts signal characteristics for signals received from receiving regions of a grating coupler having improved sensitivity to beam alignment, according to some embodiments.

FIG. 3-4 depicts an example of a receiving region and corresponding grating portion, according to some embodiments.

FIG. 3-5 is a flow chart depiction of a method for aligning and maintaining alignment of an incident beam on a grating coupler, according to some embodiments.

FIG. 4 depicts a cutaway perspective view of a portion of an integrated device, according to some embodiments.

FIG. 5-1A is a block diagram depiction of an analytical instrument that includes a compact mode-locked laser module, according to some embodiments.

FIG. 5-1B depicts a compact mode-locked laser module incorporated into an analytical instrument, according to some embodiments.

FIG. 5-2 depicts a train of optical pulses, according to some embodiments.

FIG. 5-3 depicts an example of parallel reaction chambers that can be excited optically by a pulsed laser via one or more waveguides and further shows corresponding detectors for each chamber, according to some embodiments.

FIG. 5-4 illustrates optical excitation of a reaction chamber from a waveguide, according to some embodiments.

FIG. 5-5 depicts further details of an integrated reaction chamber, optical waveguide, and time-binning photodetector, according to some embodiments.

FIG. 5-6 depicts an example of a biological reaction that can occur within a reaction chamber, according to some embodiments.

FIG. 5-7 depicts emission probability curves for two different fluorophores having different decay characteristics.

FIG. 5-8 depicts time-binning detection of fluorescent emission, according to some embodiments.

FIG. 5-9 depicts a time-binning photodetector, according to some embodiments.

FIG. 5-10A depicts pulsed excitation and time-binned detection of fluorescent emission from a reaction chamber, according to some embodiments.

FIG. 5-10B depicts a histogram of accumulated fluorescent photon counts in various time bins after repeated pulsed excitation of an analyte, according to some embodiments.

FIG. 5-11A-5-11D depict different histograms that may correspond to the four nucleotides (T, A, C, G) or nucleotide analogs, according to some embodiments.

The features and advantages of the present invention will become more apparent from the detailed description set forth below when taken in conjunction with the drawings. When describing embodiments in reference to the drawings, directional references ("above," "below," "top," "bottom," "left," "right," "horizontal," "vertical," etc.) may be used. Such references are intended merely as an aid to the reader viewing the drawings in a normal orientation. These directional references are not intended to describe a preferred or only orientation of features of an embodied device. A device may be embodied using other orientations.

DETAILED DESCRIPTION

I. Grating Couplers

Figure 1:
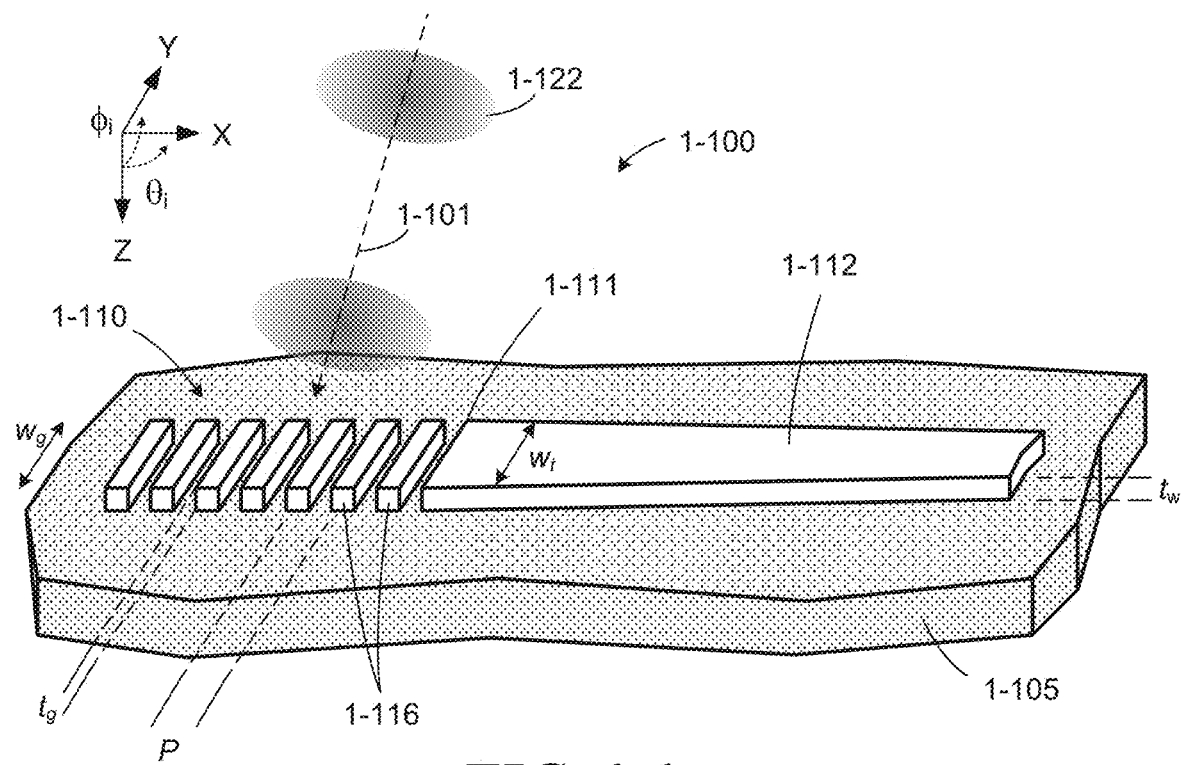
FIG. 1-1 is a perspective view depicting optical pulses incident on a grating coupler, according to some embodiments.
Figures 1, 2:
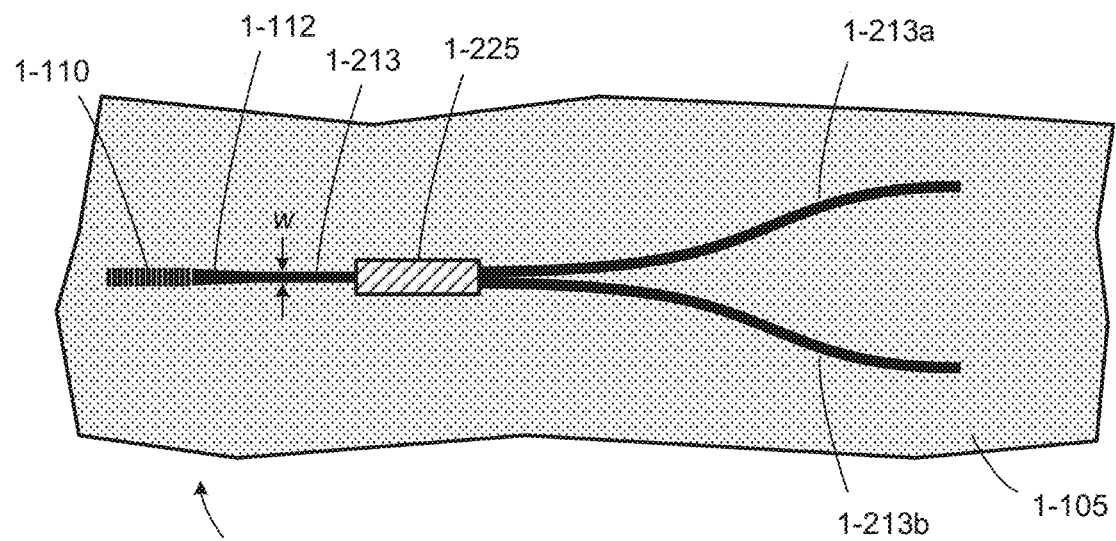

Grating couplers are useful integrated optical devices for coupling optical radiation from an external optical beam into integrated optical waveguides located on a substrate. For explanation purposes, FIG. 1-1 illustrates an example of a grating coupler 1-100 that is integrated on a substrate 1-105. A grating coupler 1-100 can comprise an optical grating 1-110 and a receiving region 1-112 of an optical waveguide having an inlet 1-111. In the illustrated example, the grating 1-110 is located adjacent to the inlet 1-111, and the grating coupler 1-100 is configured to redirect and couple incident optical radiation (depicted as a beam of optical pulses 1-122 travelling along an optical axis 1-101 of the beam) into the receiving region 1-112 of a waveguide via the inlet 1-111. The receiving region 1-112 may connect to one or more waveguides downstream from the inlet 1-111, as depicted in FIG. 1-2. For directional reference in the illustration of FIG. 1-1, a coordinate axis is chosen such that the x and y directions are parallel to a top surface of the substrate 1-105 on which the grating coupler is formed. However, the invention is not limited to the illustrated orientation of a Cartesian coordinate reference frame. Other reference frames (polar, spherical) and other orientations may be used to describe the invention.

When describing a component as being "on" or "over" a substrate or layer, the component may be directly on the substrate or layer, or there may be one or more intervening layers of material and/or one or more intervening components between the component and the substrate or layer. The phrase "directly on" is used to indicate that a component is in direct physical contact with an immediately adjacent substrate or layer.

FIG. 1-2 is a plan view of an example grating coupler 1-100 and portions of waveguides 1-213a, 1-213b formed on a substrate 1-105. The grating coupler 1-100 can connect to and couple radiation into a first waveguide 1-213, which can connect to two or more waveguides 1-213a, 1-213b. Any of the waveguide sections may be single transverse mode or multimode waveguides. Any of the waveguide sections can comprise a waveguide core formed by a first dielectric material having a first index of refraction and one or more cladding layers surrounding, or partly surrounding, the core. Values of indices of refraction for the one or more cladding layers can be less than the index of refraction for the waveguide core.

A power divider 1-225 may divide power received from the first waveguide 1-213 into the two illustrated waveguides 1-213a, 1-213b, according to some embodiments. In some implementations, power from a first waveguide 1-213 may be divided into more than two waveguides. In some cases, a power divider may not be used and only a single waveguide 1-213 may extend from the grating coupler 1-100. In some cases, waveguides 1-213a, 1-213b may connect to additional power dividers so that optical power in the waveguides can be further distributed to a plurality of waveguides.

Some examples of power dividers 1-225 include waveguide couplers or waveguide splitters, in which a propagating mode in a first waveguide couples evanescently to one or more propagating modes in one or more adjacent waveguides. Other examples of power dividers 1-225 include interferometric splitters, such as Mach-Zehnder interferometers and multi-mode interference couplers. Regardless of the type of power divider 1-225 and number of downstream waveguides, power from the first waveguide 1-213 can be divided equally or unequally among the downstream waveguides by selecting a suitable design and splitting ratio of the power divider 1-225.

Figures 1, 2, 3:
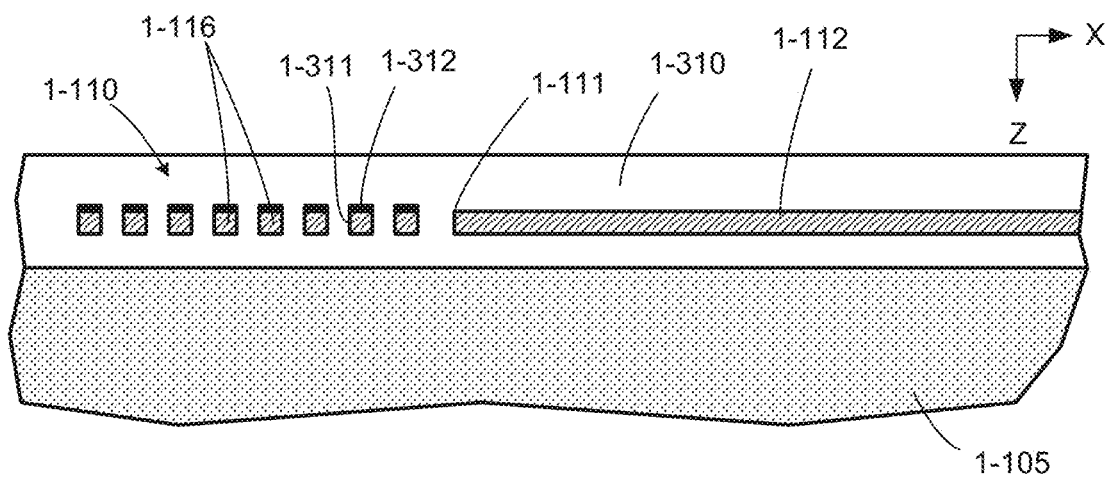

FIG. 1-3 depicts an elevation view that roughly corresponds to the structure shown in FIG. 1-1, according to one embodiment. An optical grating 1-110 can be patterned as lines 1-116 in a first material that has a higher (or lower in some cases) index of refraction than an adjacent material 1-310 adjacent to the grating lines. (The adjacent material 1-310 is not shown in FIG. 1-1.) In some embodiments, an optical grating 1-110 is embedded in one or more surrounding materials. For example, instead of a single adjacent material 1-310 surrounding the grating 1-110, the grating may be formed between two or more layers of different material. Lines (or teeth) 1-116 of the grating 1-110 can be formed from a single layer of material (as depicted in FIG. 1-1), or may comprise two or more layers of material (as depicted in FIG. 1-3). For example, a second material 1-312 may be deposited over a first material 1-311 and patterned when forming the lines 1-116. Addition of one or more second material layers may improve the diffraction efficiency of the grating 1-110. Materials that may be used to form the grating lines 1-116 include, but are not limited to, dielectrics (oxides, nitrides), semiconductors, metals, and combinations of these materials when two or more layers are used. Such example materials include silicon oxide, tantalum oxide, aluminum oxide, silicon nitride, nitrogen-rich silicon nitride (e.g., having more nitride than a stoichiometric ratio for $Si_3N_4$), silicon, silicon-germanium, germanium, aluminum, tungsten, and polymeric materials. In one example embodiment, a grating 1-110 can be formed primarily from nitrogen-rich silicon nitride and the adjacent material 1-310 surrounding the grating can comprise silicon oxide.

One or more adjacent materials 1-310 surrounding the optical grating 1-110 can be optically transparent to the optical radiation that is being coupled into the receiving region 1-112 by the optical grating 1-110. Preferably, the one or more adjacent materials 1-310 exhibits low optical loss to the optical radiation that is being coupled into the waveguide. Materials that may be used for the one or more adjacent materials 1-310 include, but are not limited to, oxides, nitrides, and polymers as described above.

According to some embodiments, an optical grating 1-110 can have a periodicity P between 200 nm and 800 nm. In other embodiments, the grating 1-110 may have a periodicity P less than 200 nm or greater than 800 nm. A duty cycle of the grating (ratio of width of a grating line 1-116 in the x direction to the periodicity P can be between 20% and 80%. A thickness $t_g$ of the grating lines 1-116 can be between 20 nm and 500 nm, according to some embodiments. A width $w_g$ of the grating teeth 1-116 associated with coupling into a single inlet 1-111 can be between 50 nm and 500 nm. According to some embodiments, a last line 1-116 of the grating 1-110 adjacent to the inlet 1-111 may be spaced from the inlet 1-111 by a distance that is equivalent to a space between the grating lines 1-116 (as depicted in FIG. 1-1). In some cases, a last line 1-116 of the grating 1-110 may be spaced from the inlet 1-111 by a distance that is an integer number of spaces between the grating lines 1-116 or a non-integer number of spaces between the grating lines 1-116.

A receiving region 1-112 and an optical waveguide 1-213 can be patterned in a first material that has a higher index of refraction than an adjacent material 1-310 to the receiving region 1-112 and/or waveguide 1-213. In some embodiments, the receiving region 1-112 and optical waveguide 1-213 can be embedded in one or more surrounding materials. The receiving region, waveguide, and one or more surrounding materials can be optically transparent to the radiation transported by the waveguide. Preferably, the receiving region 1-112, waveguide 1-213, and one or more adjacent materials 1-310 exhibit low optical loss to the optical radiation transported by the waveguide (e.g., less than 1 dB/cm). Materials that may be used for the receiving region 1-112, waveguide 1-213, downstream waveguides 1-213a, 1-213b, and the one or more second materials 1-310 include, but are not limited to, oxides and nitrides as described above. As an example, the waveguide 1-213, receiving region 1-112, and downstream waveguides 1-213a, 1-213b can be formed from silicon nitride (or a nitrogen-rich silicon nitride) and the one or more adjacent materials 1-310 can be formed from silicon oxide.

According to some embodiments, a receiving region 1-112 may be tapered, as illustrated in the example of FIG. 1-1. Along the tapered region, a width $w_t$ of the waveguide core in the receiving region may decrease in size in an x direction, moving away from the inlet 1-111, until it matches a width w of a core in a uniform portion of the waveguide 1-213 at a downstream location, as depicted in FIG. 1-2. In other embodiments, a width $w_t$ of the waveguide core in the tapered region 1-112 may increase in size in an x direction, moving away from the inlet 1-111, until it matches a width w of a uniform portion of the core of the waveguide 1-213. Additionally or alternatively, a thickness $t_w$ of a core in the receiving region 1-112 can be tapered, changing in size until it matches a thickness of a core of the connected waveguide 1-213. Tapering the width and/or thickness of the core in the receiving region 1-112 can improve coupling efficiency of the optical radiation into the receiving region and downstream waveguide, e.g., when a transverse size (mode profile) of an incident beam is significantly different than the size of an optical mode (e.g., fundamental mode size) supported by the waveguide 1-213.

According to some embodiments, a width w of a core in a uniform portion of a waveguide 1-213 can be between 200 nm and 800 nm. A thickness $t_w$ of a core in the uniform portion of a waveguide 1-213 can be between 20 nm and 500 nm. In some implementations, a width and thickness of a waveguide core is selected such that the waveguide 1-213 supports only a single transverse optical mode (a fundamental optical mode) within the waveguide. In some cases, a waveguide 1-113 may support more than one transverse optical mode. A width $w_t$ of a core in the tapered receiving region 1-112 may be smaller than 200 nm at the inlet 1-111 in some cases, or larger than 800 nm at the inlet in other cases. In some implementations, the receiving region may not be tapered. A thickness $t_w$ of a core at the inlet of the receiving region 1-112 can be between 20 nm and 500 nm.

A grating 1-110, receiving region 1-112, and waveguide 1-213 can be fabricated using planar microfabrication techniques, such as those described in U.S. patent application Ser. No. 15/844,403 filed Dec. 15, 2017 and title "Optical Coupler and Waveguide System," which application is incorporated herein by reference in its entirety. Such microfabrication techniques can include steps of patterning gratings and waveguides in resist using photomasks and photolithography techniques, and etching patterns of the gratings and waveguides in oxide and/or nitride layers using etching processes such as anisotropic reactive ion etching. Such microfabrication techniques can also include steps of depositing resists and layers used to form the grating coupler, and removing residual resists and portions of layers.

In operation, a grating coupler 1-100 can diffract incident optical radiation into one or more different directions away from the path of the incident beam (which proceeds along an optical axis 1-101). By designing the grating coupler carefully (e.g., choosing an appropriate pitch P of the grating 1-110 for an operating, characteristic wavelength) and orienting the incident beam correctly, a majority of the incident optical radiation can be diffracted toward the inlet 1-111 from the grating 1-100 and essentially coaxial with the receiving region 1-112. Thereby, a majority of incident radiation can couple into the receiving region 1-112 and downstream waveguide 1-213. The orientation of the incident beam (shown as pulses 1-122 in the example of FIG. 1-1) can be described by the beam's location and incident angles. For example, the beam's location on the grating 1-110 may be describes as a position (in x and y directions) of a center (e.g., optical axis 1-101) of the beam with respect to a center of the grating 1-110 or a center of the inlet 1-111 in some cases. The beam's incident angles may be described by a first incidence angle or pitch angle $\theta_i$ (e.g., measured from the z axis toward the x direction, rotating about the y axis), and a second incidence angle or tilt angle $\phi_i$ (e.g., measured from the z axis toward the y direction, rotating about the x axis). Changes in the beam's position on the grating 1-110, pitch angle $\theta_i$, and tilt angle $\phi_i$ can change the coupling efficiency of the incident beam into the receiving region 1-112 and downstream waveguide 1-213.

Features, materials, and dimensions described above for the grating coupler embodiments of FIG. 1-1, FIG. 1-2, and FIG. 1-3 can be implemented in the grating couplers described in the following embodiments that couple directly from a grating 1-110 to more than one receiving region.

The inventors have recognized and appreciated that once an incident beam of optical pulses 1-122 (or continuous wave incident beam) is aligned to the grating coupler 1-100 for a highest coupling efficiency, there can be ambiguities or uncertainties in knowing how a beam's orientation has changed when reductions in power coupled into a receiving region 1-112 or downstream waveguides are detected. For example, when oriented for highest coupling efficiency with regard to position of the incident beam on the grating 1-110, motion of the beam toward the inlet 1-111 or away from the inlet 1-111 produces a very similar characteristic reduction in coupling efficiency. Therefore, by detecting a reduction in power in a downstream waveguide, one cannot determine readily whether the incident beam has moved toward or away from the inlet 1-111. Accordingly, automated correction of beam position to maintain a high coupling efficiency is complicated by the ambiguity in x-directed motion of the beam.

A similar result occurs for changes in the pitch angle $\theta_i$. For example, after obtaining a highest coupling efficiency with regard to pitch angle, an increase or decrease in pitch angle produces a essentially a same reduction in coupling efficiency. Therefore, automated correction of beam position to maintain a high coupling efficiency is further complicated by the ambiguity in $\theta_i$-directed motion of the beam.

FIG. 2-1 depicts an embodiment of a grating coupler 2-100 having improved beam-alignment sensitivity in which a direction of movement of the incident beam 2-102 in an x direction (causing a reduction in coupling efficiency) can be disambiguated. The illustration shows a plan view of the grating coupler. In the illustrated embodiment, the grating coupler 2-100 comprises five receiving regions 2-112a-2-112e having five inlets 2-111a-2-111e, some of which are offset with respect to other inlets in the x direction or in a direction perpendicular or essentially perpendicular to lines 2-116 of the grating. In some implementations, there can be fewer or more than five receiving regions. For some applications, there can be tens or over a hundred receiving regions and inlets in a grating coupler 2-100. To simplify the illustration, only the grating lines and receiving regions of the waveguides are shown. The grating lines 2-116 and receiving regions 2-112a-2-112e of the waveguides can be formed on a substrate 1-105 along with surrounding materials, as described above in connection with FIG. 1-1 through FIG. 1-3.

By using multiple inlets 2-111a-2-111e, the grating coupler 2-100 can couple radiation from a high power beam 2-102 directly into multiple waveguides. (An example transverse beam profile, such as $1/e^2$ width(s), is indicated as a dashed ellipse.) Coupling directly into multiple waveguides can be advantageous to avoid damaging the optical waveguides and to avoid undesirable nonlinear optical behavior that can occur at higher powers. Further, the transverse widths $w_t$ of the inlets 2-111a-2-111e in the y direction can be sized to obtain a desired power ratio among the receiving regions 2-112a-2-112e. For example, the outer inlets 2-111a, 2-111e can be wider than the center inlet 2-111c, such that each receiving region 2-112a, 2-112c, and 2-112e couples approximately a same amount of optical power from the incident beam. In some embodiments, all receiving regions may couple approximately a same amount of optical power from the incident beam, so that each waveguide downstream of a receiving region carries approximately a same amount of optical power. Other power coupling ratios may be implemented in other embodiments by selecting appropriate widths of the inlets 2-111a-2-111e and receiving regions 2-112a-2-112e.

According to some embodiments, one or more of the inlets 2-111a-2-111e may be located essentially along a same reference line 2-115, which may be straight or curved. In some cases, as depicted in the illustrated example of FIG. 2-1, a majority of the inlets 2-111a, 2-111c, 2-111e are located along a same reference line 2-115 (depicted as a dotted line at $x=X_i$). Although the reference line is shown as being straight in the illustration, in some implementations the reference line 2-115 may be curved (e.g., to accommodate a curvature of the shape of the incident beam 2-102). A reference line 2-115 can correspond to locations where two or more inlets of receiving regions would be located to provide highest coupling efficiencies into the two or more receiving regions when an incident beam is positioned on a grating for highest coupling efficiency into one of the two or more receiving regions. For a grating coupler 2-100 having improved x-direction sensitivity at least one inlet is located away from the reference line 2-115 in an x direction by an amount |Δx|. In some embodiments, two or more inlets are located away from the reference line 2-115 in an x direction by an amount |Δx| or by two different amounts. In some cases, it is possible to have a majority of the inlets located away from the reference line 2-115 in an x direction by an amount |Δx| or by a plurality of different amounts. In such cases, a reference line 2-115 may align with as few as one inlet (e.g., an inlet located at an average x location among all inlets).

An amount by which one or more inlets 2-111b, 2-111d can be offset from a reference line 2-115 can be between 0.5 micron and 10 microns, or approximately these end values according to some embodiments, and for a wavelength of the incident beam between 400 nm and 800 nm or approximately these end values. The offset inlets 2-111b, 2-111d and receiving regions 2-112b, 2-112d can couple less power than they would if they were located on the reference line 2-115. In some embodiments, the widths of the offset inlets and receiving regions may be sized to couple a desired power ratio among all inlets and receiving regions (e.g., a same amount of power into each inlet and receiving region).

Disambiguation of beam motion can be sensed by monitoring power in a waveguide connected to an offset inlet (e.g., inlet 2-112d). For example and referring again to FIG. 2-1, an initial beam alignment can optimize power coupled into one or more inlets and receiving regions lying along a reference line 2-115 (such as inlet 2-111c and receiving region 2-112c). For optimization of coupling efficiency, power or intensity can be monitored from waveguide(s) connected to the one or more inlets and receiving regions lying along the reference line 2-115. In some cases, monitoring can be done at one or more sites on a chip to which a waveguide delivers power. For example, a site on a chip may include a photodetector that can sense an amount of intensity of radiation in a waveguide. After optimization of coupling efficiency, power or intensity monitored in one or more offset inlets and receiving regions can indicate which direction (in x) an incident beam moves. For example, if power is monitored in a waveguide connected to receiving region 2-112d, an increase in power would indicate that the incident beam 2-102 has moved in the −x (upstream) direction. A decrease in power would indicate that the incident beam 2-102 has moved in the +x (downstream) direction. Although examples described herein refer to power of the incident beam, intensity may be monitored alternatively or additionally.

For the same grating coupler 2-100, power monitored in a waveguide connected to receiving region 2-112b would show an opposite behavior to that of power monitored in a waveguide connected to receiving region 2-112d. Movement of the incident beam 2-102 in the −x direction would result in a decrease of power coupled into the receiving region 2-112b. Movement of the incident beam 2-102 in the +x direction would result in an increase of power coupled into the receiving region 2-112b. Differencing power signals from two waveguides connected to the two receiving regions 2-112b, 2-112d can increase the sensitivity for detecting motion of the input beam 2-102.

FIG. 2-2 depicts another embodiment of a grating coupler 2-200 having improved beam-alignment sensitivity. The grating coupler 2-200 may be nearly the same as the grating coupler 2-100 of FIG. 2-1, except that the inlets and receiving regions 2-112a-2-112e are spatially separated in the y direction rather than being abutted and in contact at their edges. The grating 2-210 may comprise separated portions 2-210a-2-210e, as illustrated in FIG. 2-2, or may be formed with continuous lines 2-116 as shown in FIG. 2-1. Separating the inlets 2-111a-2-111e and receiving regions 2-112a-2-112e in the y direction may result in a reduced coupling efficiency, but may improve optical mode profiles in the receiving regions by reducing effects of discontinuities in the immediately abutted inlet faces. The grating 2-210 and receiving regions 2-112a-2-112e can be formed on a substrate 1-105 along with surrounding materials, as described above in connection with FIG. 1-1 through FIG. 1-3.

In some applications, it may be desirable to couple a plurality of incident beams 2-330 into a plurality of integrated waveguides. FIG. 2-3 illustrates another embodiment of a grating coupler 2-300 having improved beam-alignment sensitivity for such applications. The grating coupler 2-300 can comprise a grating 2-310 and a plurality of receiving regions 2-312a-2-312d adjacent to the grating 2-310. The grating may comprise separated portions 2-310a-2-310d, as illustrated, or may be formed like the grating in FIG. 2-1 having continuous lines 2-116. The receiving regions 2-312a-2-312d may be separated in a y direction as illustrated, or may be abutted immediately adjacent to each other. At least one of the receiving regions and inlets may be offset in the x direction from a reference line 2-115. According to some implementations, the widths of the receiving regions and inlets may be approximately the same. In some embodiments, widths of receiving regions and inlets for the offset gratings may be larger than widths of receiving regions and inlets for inlets lying on the reference line 2-115 (e.g., in order to obtain a same amount of power in each receiving region).

Provided the plurality of incident beams 2-330 move together as a unit, rather than independently, motion of the plurality of incident beams 2-330 in the x direction will produce the same changes in power coupled into the offset receiving regions as described above in connection with FIG. 2-1. For example, motion of the incident beams 2-330 in the +x direction can be detected as an increase in power for a waveguide connected to receiving region 2-312b and a decrease in power for a waveguide connected to receiving region 2-312c. Also, motion of the incident beams 2-330 in the −x direction can be detected as a decrease in power for a waveguide connected to receiving region 2-312b and an increase in power for a waveguide connected to receiving region 2-312c. The grating 2-310 and receiving regions 2-312a-2-312e can be formed on a substrate 1-105 along with surrounding materials, as described above in connection with FIG. 1-1 through FIG. 1-3.

Figures 1, 2:
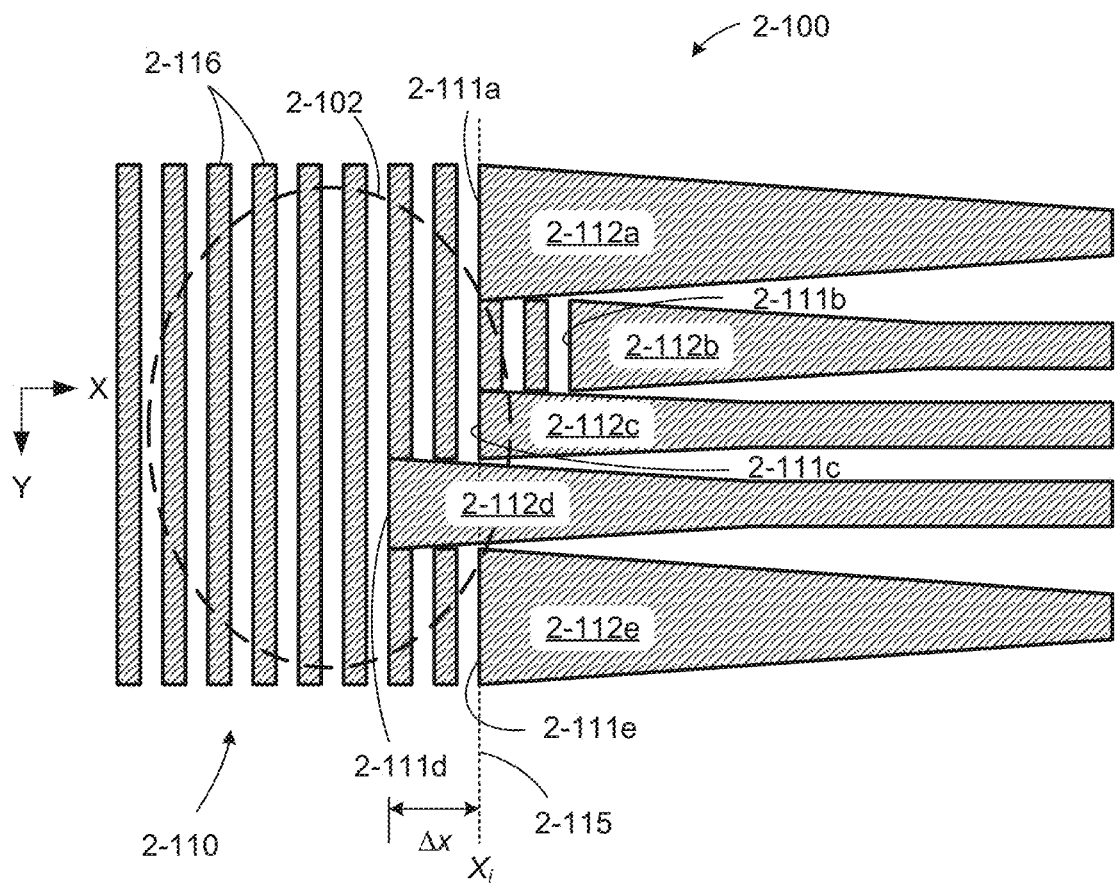
Figure 2:
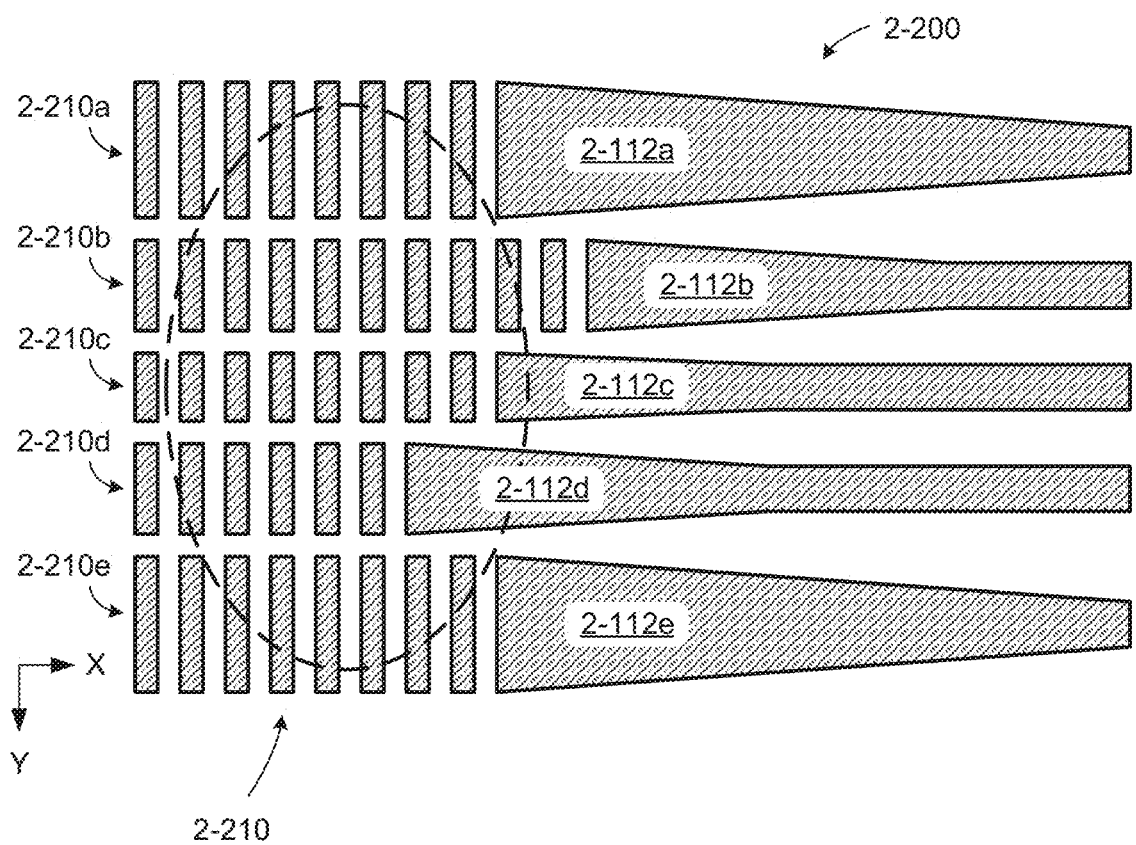
Figures 2, 3:
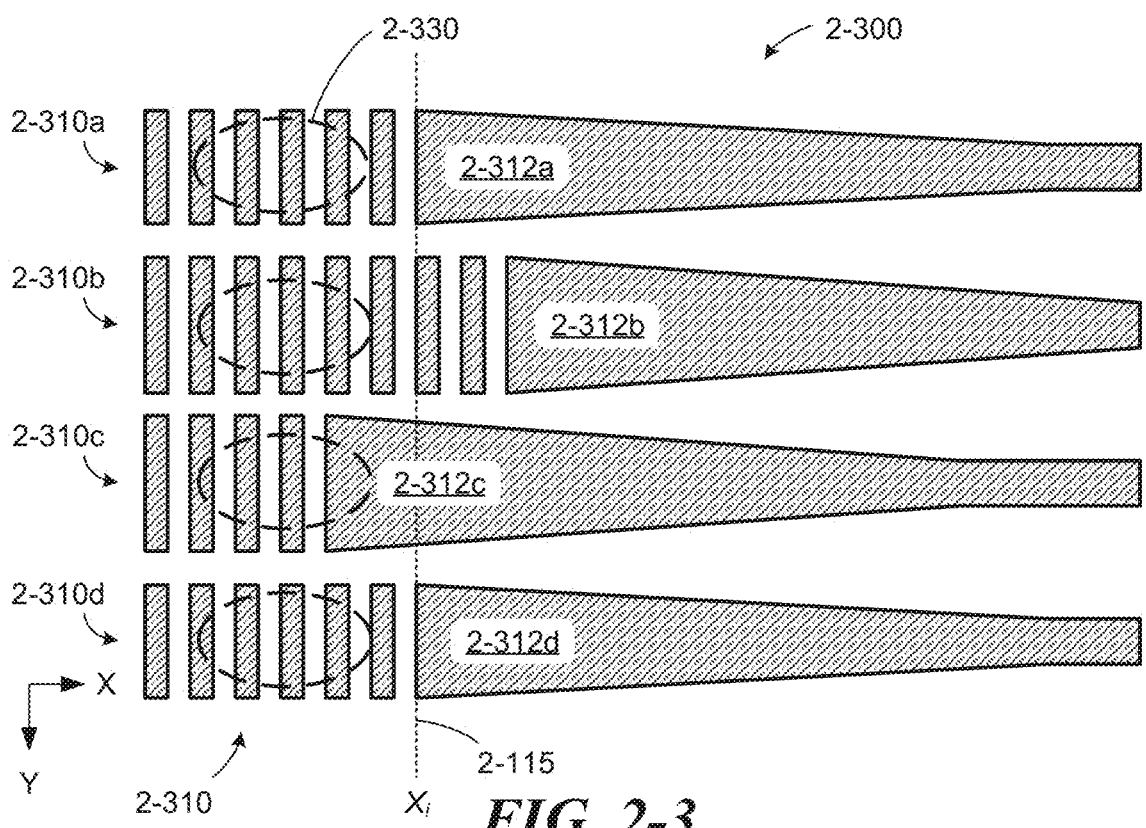
Figures 2, 3, 4:
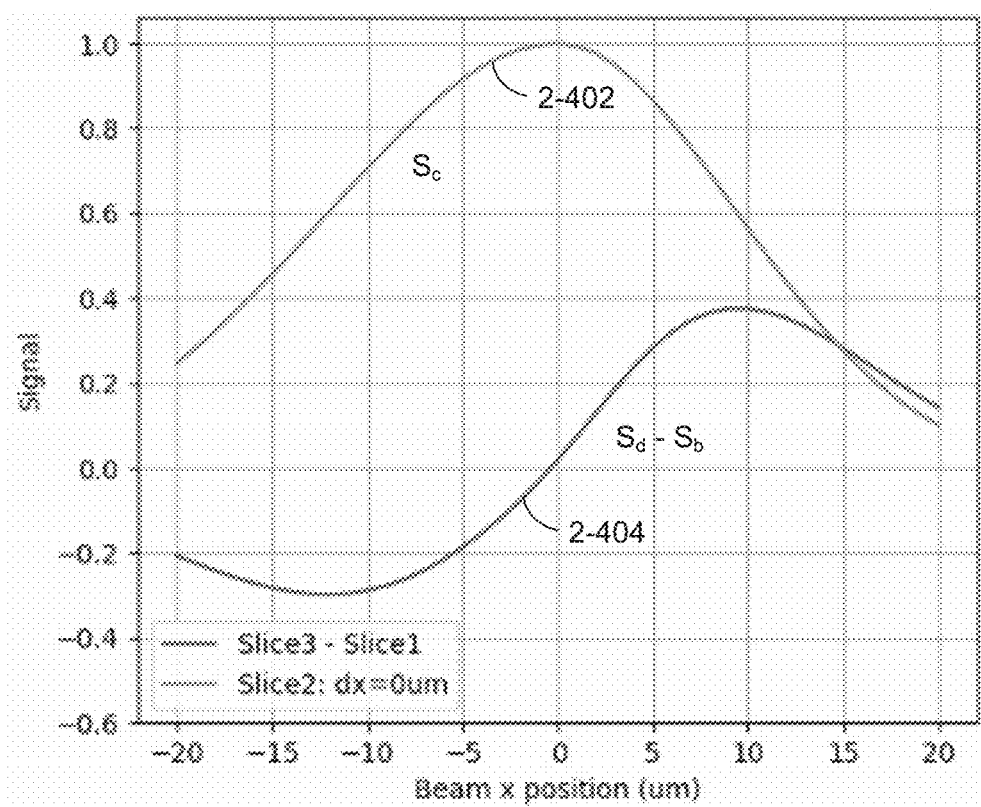

FIG. 2-4 plots simulation results for a grating coupler having improved sensitivity to changes in the x position of an incident beam, such as the coupler illustrated in FIG. 2-1. A first curve 2-402 illustrates a change in signal $S_c$ received from a receiving region 2-112c having an inlet lying on a reference line 2-115. Highest coupling efficiency into the receiving region 2-112c is obtained for an incident beam positioned at a reference x position (arbitrarily set to 0 microns). As can be seen from the first curve 2-402, the signal level changes similarly for an increase or decrease in beam position along the x direction. Although there is an asymmetry in the curve, the difference can be small and difficult or impossible to reliably discern in an implemented automated system. For example, each signal value between −20 microns and 20 microns does not uniquely identify a beam position. A second curve 2-404 illustrates a change in a difference signal $S_d-S_b$ received from two receiving regions that are offset from the reference line 2-115, as depicted in FIG. 2-1. The difference signal shows a continuous increase for changes in beam location from x≈−7 microns to x≈+7, and can clearly distinguish motion of the beam in the −x direction from motion of the beam in the +x direction. Nonlinearity in the curve can be calibrated and compensated for electronically. For this simulation, the two receiving regions were offset by +5 microns and −5 microns, though the invention is not limited to only these offset values. Smaller or larger offsets may be used in some embodiments.

Another embodiment of a grating coupler 3-100 having improved beam-alignment sensitivity is illustrated in FIG. 3-1. The illustrated example can disambiguate changes in pitch angle $\theta_i$ (illustrated in FIG. 1-1) of an incident beam 2-102. For such embodiments, the grating coupler 3-100 can comprise a grating 3-110 having a plurality of portions 3-110a-3-110e, at least two of which have different or offset grating periodicities (e.g., $P_1$, $P_2$). In some implementations, the inlets of receiving regions 3-112a-3-112e may lie along a common reference line 2-115, which may be straight or curved as described above. The grating portions 3-110a-3-110e and receiving regions 3-112a-3-112e may immediately abut each other in the y direction, as illustrated, or may be separated from each other (like those depicted in FIG. 2-2). In some embodiments, the grating portions 3-110a-3-110e and receiving regions 3-112a-3-112e may be separated and sized as depicted in FIG. 2-3 for coupling a plurality of incident beams into a plurality of waveguides.

One or more of the grating portions 3-110a, 3-110c, 3-110e may have a same grating periodicity $P_1$ which may be a reference periodicity. In some cases, a majority of the grating portions 3-110a, 3-110c, 3-110e may have a same reference grating periodicity $P_1$. The reference periodicity may be one that provides a highest coupling efficiency into each of the corresponding receiving regions (e.g., receiving regions 3-112a, 3-112c, 3-112e) when an incident beam 2-102 is oriented for a highest coupling efficiency into one of the corresponding receiving regions. At least one of the grating portions 3-110b can have an offset periodicity $P_2$ that differs from the reference periodicity $P_1$. An offset periodicity may result in reduced coupling efficiency into the corresponding receiving region 3-112b. In some cases, there may be one or more additional grating portions 3-110d having one or more additional offset periodicities $P_3$. The grating 3-110 and receiving regions 3-112a-3-112e can be formed on a substrate 1-105 along with surrounding materials, as described above in connection with FIG. 1-1 through FIG. 1-3.

For a grating portion 3-110a having a reference periodicity $P_1$, diffraction of a portion of the incident beam can be essentially in the y direction, e.g., directly into the corresponding inlet and essentially coaxial with a core of the receiving region. A change in pitch of the incident beam in the $+\theta_i$ direction would produce essentially the same reduction in power behavior as a change in pitch in the $-\theta_i$ direction (referring again to FIG. 1-1.) For a grating portion 3-110b having a periodicity $P_2$ that is less than $P_1$, diffraction of a portion of the incident beam can be mainly in the y direction but also partly in the −z direction (out of the paper). This can result in reduced coupling efficiency into the receiving region 3-112b. However, a change in pitch of the incident beam in the +a direction would decrease power coupled into the receiving region 3-112b, whereas a change in pitch of the incident beam in the $-\theta_i$ direction would increase power coupled into the receiving region 3-112b. Monitoring power or intensity from a waveguide coupled to the receiving region 3-112b can then disambiguate changes in pitch of the incident beam 2-102 in the $\pm\theta_i$ directions.

An opposite behavior from that of grating portion 3-110b can be obtained for a grating portion 3-110d having a periodicity $P_3$ that is greater than $P_1$. Where the periodicity $P_3$ is greater than the reference periodicity $P_1$, diffraction of a portion of the incident beam can be mainly in the y direction but also partly in the +z direction (into the plane of the figure). A change in pitch of the incident beam in the $+\theta_i$ direction would increase power coupled into the receiving region 3-112d, whereas a change in pitch of the incident beam in the $-\theta_i$ direction would decrease power coupled into the receiving region 3-112d. Differencing signals received from both receiving regions 3-112b, 3-112d can increase detection sensitivity for changes of incident beam orientation in the $\pm\theta_i$ directions.

According to some embodiments, the amount of offset in grating periodicity from the reference periodicity $P_1$ can be between 0.1% and 1% of the reference periodicity $P_1$. For some visible optical configurations, the change in periodicity of an offset grating can be between 0.5 nm and 4 nm, or between approximately 0.5 nm and approximately 4 nm.

FIG. 3-2 depicts an example of a grating coupler 3-200 that combines the aspects of offset receiving regions 3-212b, 3-212d and offset grating periodicities $P_2$, $P_3$. The grating coupler 3-200 can include a grating 3-210 comprising a grating portion 3-210b that has a reference periodicity $P_1$ and one or more additional portions 3-210a, 3-210c with one or more offset periodicities $P_2$, $P_3$. The grating coupler 3-200 may further include one or more receiving regions 3-212a, 3-212c, 3-212e having inlets located along a reference line 2-115 and one or more receiving regions 3-212b, 3-212d with inlets that are offset in an x direction from the reference line 2-115. For the illustrated example, power changes detected from waveguides connected to the receiving regions 3-212b and/or 3-212d can unambiguously indicate motion of the incident beam location on the grating 3-210 in the +x or −x direction. Power changes detected from waveguides connected to the receiving regions 3-212a, 3-212e can unambiguously indicate motion of the incident beam location on the grating 3-210 in the $+\theta_i$ or $-\theta_i$ direction.

FIG. 3-3 plots simulation results for a grating coupler having improved sensitivity to changes in the pitch angle $\theta_i$ of an incident beam, such as the coupler illustrated in FIG. 3-1. A first curve 3-302 illustrates a change in signal $S_c$ received from a receiving region 3-112c that is adjacent to a grating having a reference periodicity $P_1$. For the chosen grating design and characteristic wavelength, a highest coupling efficiency into a receiving region adjacent to a grating portion having the reference periodicity is obtained for an incident pitch angle of −4.0 degrees. As can be seen from the first curve 3-302, the signal level changes essentially identically for an increase or decrease in incident pitch angle of the beam from an aligned position at −4.0 degrees. Each signal level does not uniquely identify an incident angle of the beam. A second curve 3-304 illustrates a change in a difference signal $S_d-S_b$ received from two receiving regions that are adjacent to two grating portions having offset periodicities ($P_2<P_1$, $P_3>P_1$). The difference signal is essentially linear over the range of incident angles and can clearly indicate the direction of change in pitch angle. For this simulation, the difference in offset grating periodicities were +1 nm and −1 nm from the periodicity $P_1$ of the reference grating, though offsets in grating periodicities are not limited to only these values. Smaller or larger offsets in grating periodicity may be used.

Although the grating lines and inlets of receiving regions in the embodiments illustrated in FIG. 2-1 through FIG. 3-2 are depicted as straight, in some implementations the grating lines and inlets may be curved in any of the embodiments. FIG. 3-4 illustrates an example in which a grating 3-410 adjacent to a receiving region 3-412 has curved lines 3-416. Additionally the inlet 3-411 of the receiving region 3-412 may have a curved surface. Curved grating lines 3-416 and/or a curved inlet 3-411 may improve coupling efficiency into the receiving region 3-412. In some cases, curved grating lines 3-416 and/or a curved inlet 3-411 may additionally or alternatively improve optical mode profile in the receiving region 3-412.

Figures 1, 3:
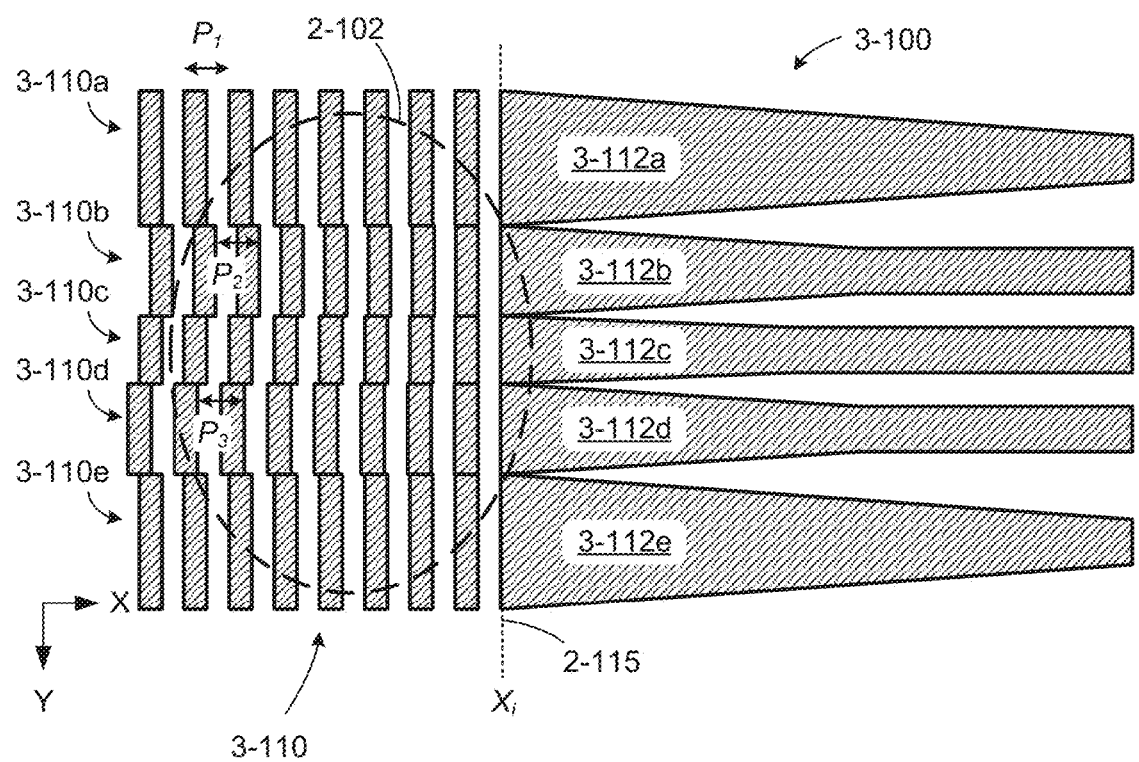
Figures 2, 3:
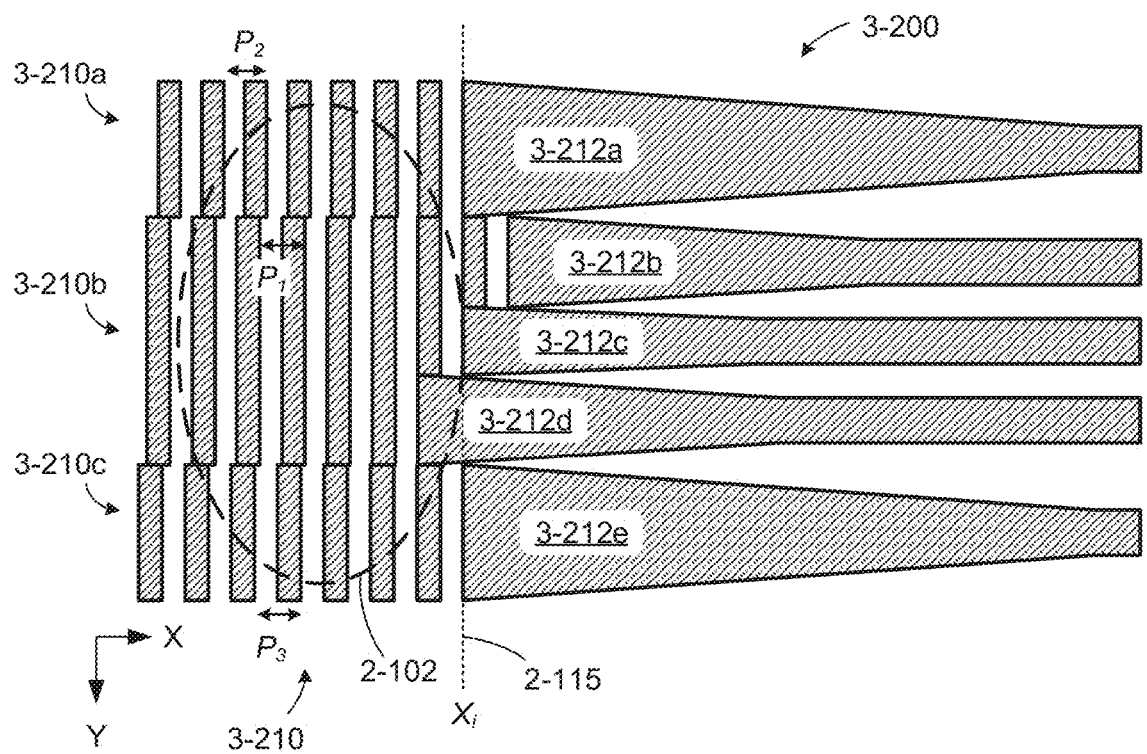
Figure 3:
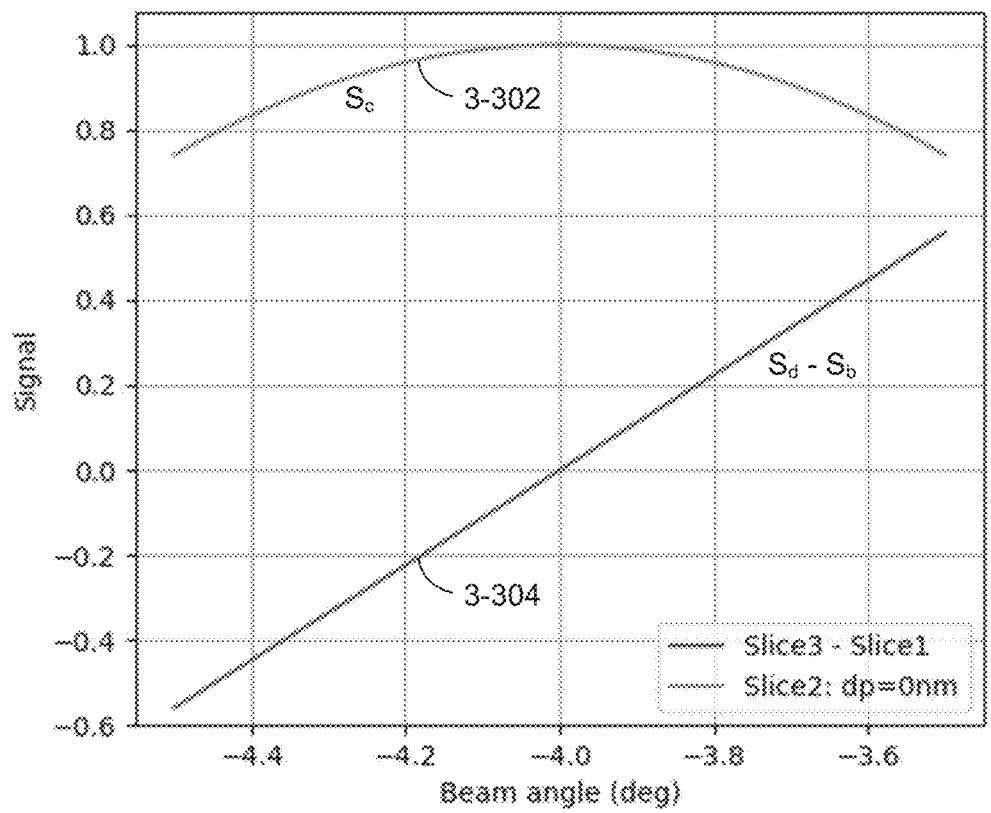
Figures 3, 4:
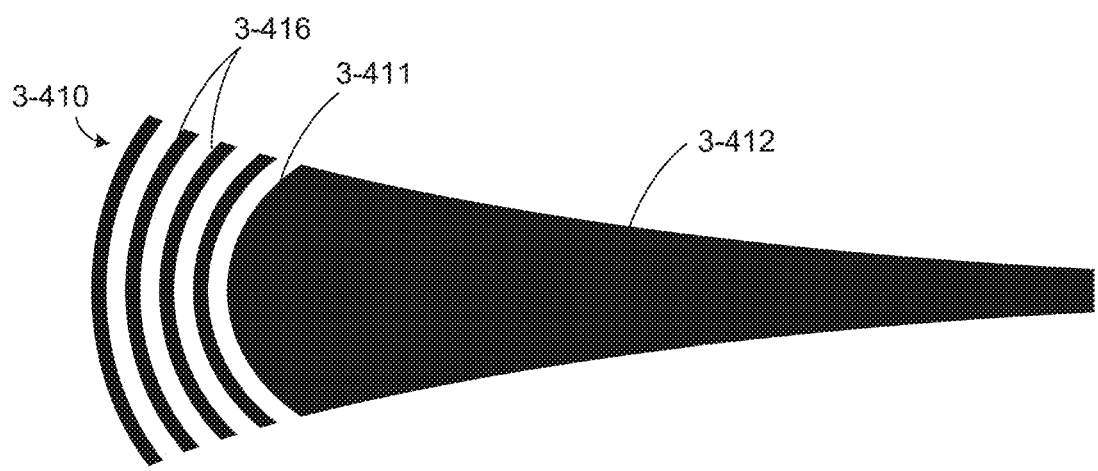
Figures 3, 4, 5:
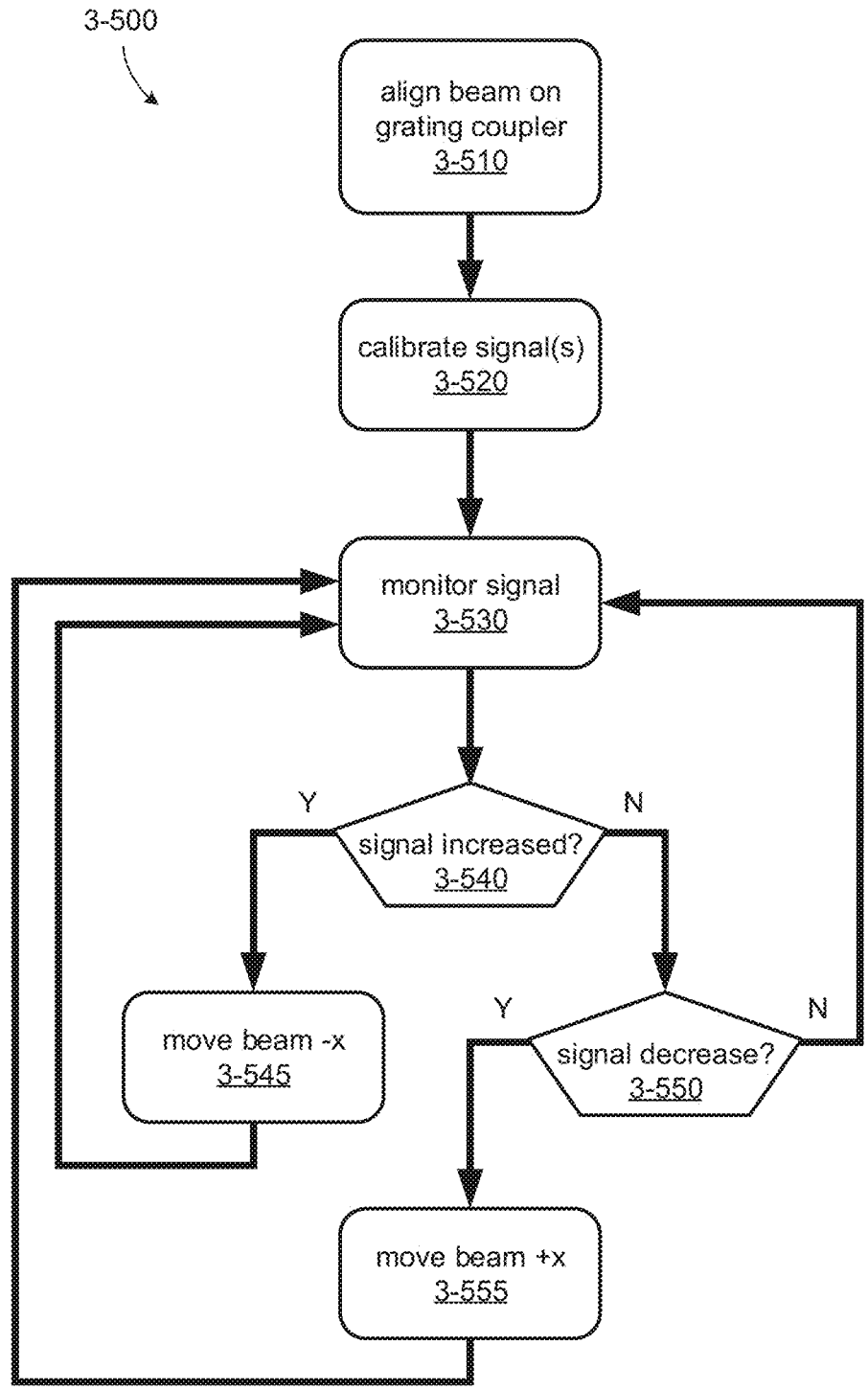
Figure 4:
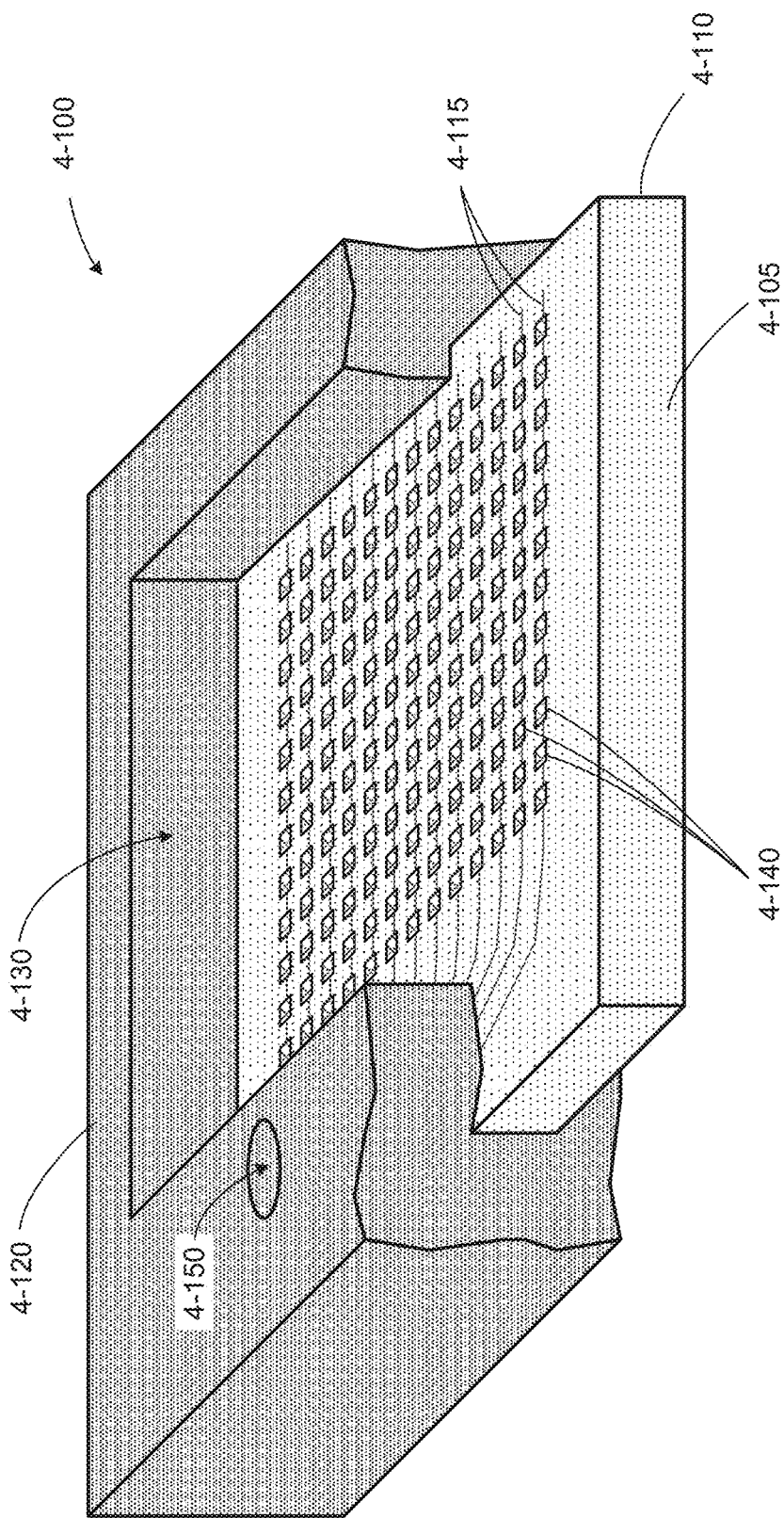

FIG. 3-5 is a flow chart illustrating an example method 3-500 for aligning and maintaining alignment of an incident beam on a grating coupler of the present embodiments. Some or all of the acts of the method may be automated (e.g., by using automated beam-steering and positioning instruments). A method 3-500 may include acts of first aligning (act 3-510) an incident beam 2-102 on a grating 2-110 of a grating coupler 2-100. An aligned position may be an orientation that provides a highest, or approximately highest, coupling efficiency into a reference receiving region (e.g., a receiving region having an inlet 2-111 lying on a reference line 2-115 and/or a receiving region having an inlet for a corresponding reference grating periodicity $P_1$). After an aligned orientation is obtained, the beam orientation may be scanned in x and/or $\theta_i$ directions to calibrate (act 3-520) sensors and signal levels over a set range of misaligned orientations. For each independent degree of freedom, an alignment signal level can be monitored (act 3-530). An alignment signal level may be monitored by one or more sensors integrated on a substrate on which the waveguides and grating coupler are formed. In some implementations, the sensors may be located in pixels of an analytic instrument, which is described in further detail below. An automated system may test for a signal level increase (act 3-540) or decrease (act 3-550). If a signal level increase is detected (e.g., resulting from beam motion in the +x direction), the automated system may move the beam in the −x direction (act 3-545) until the signal level is restored to essentially an aligned signal level and resume monitoring the signal (act 3-530). An aligned signal level may be a voltage level $V_a$ determined during calibration (act 3-520) of the automated alignment system, and the system may be configured to accept a range of values within a few percent of $V_a$ as indicating alignment. If a signal level decrease is detected (e.g., resulting from beam motion in the −x direction), the automated system may move the beam in the +x direction (act 3-555) until the signal level is restored to an aligned level and resume monitoring the signal (act 3-530). According to some embodiments, motion of the beam may be implemented using a galvanometer or stepper motor to move an optical component in a path of the incident beam and thereby move or change a pitch angle of the incident beam. Similar acts can be executed for detecting changes in beam pitch angle $\theta_i$ and restoring the beam to an aligned orientation.

Grating couplers described in the foregoing embodiments can be used in a variety of optical applications as mentioned above. One area in which such grating couplers can be used relates to analyzing one or a plurality of samples on a chip (e.g., lab-on-chip applications). Instruments for analyzing samples continue to improve and may incorporate microfabricated components (e.g., electronic chips, microfluidic chips) which can help reduce the overall size of the instrument. Samples to be analyzed can include air (e.g., sensing for harmful gaseous leaks, combustion by-products, or toxic chemical components), water or other ingestible liquids, food samples, and biological samples taken from subjects (blood, urine, etc.) In some cases, it is desirable to have portable, hand-held instruments for analyzing samples, so that technicians or medical personnel can easily carry the instrument into the field where service may be performed and a sample needs to be analyzed quickly and accurately. In clinical settings, a desk-top size instrument may be desired for more complex sample analysis such as sequencing of human genes or proteins or performing complete blood count analysis.

In an advanced analytic instrument, such as those described in U.S. Patent publication No. 2015/0141267 and in U.S. Pat. No. 9,617,594, both of which are incorporated herein by reference, a disposable integrated device (which may be referred to as "chip" and "disposable chip" for brevity) may be used to perform massively parallel sample analyses. The disposable integrated device may comprise a packaged bio-optoelectronic chip on which there can be a large number of pixels having reaction chambers for parallel analyses of one sample or of different samples. For example, the number of pixels having reaction chambers on a bio-optoelectronic chip can be between about 10,000 and about 10,000,000 in some cases, and between 100,000 and about 100,000,000 in some cases. Grating couplers and waveguides described above may deliver optical radiation to each of the pixels on such a bio-optoelectronic chip. In some embodiments, the disposable chip may mount into a receptacle of an advanced analytic instrument and interface with optical and electronic components in the instrument. The disposable chip can be replaced easily by a user for each new sample analysis.

Example structure 4-100 for a disposable chip is shown in FIG. 4, according to some embodiments. The disposable chip structure 4-100 may include a bio-optoelectronic chip 4-110 having a semiconductor substrate 4-105 and including a plurality of pixels 4-140 formed on the substrate. In embodiments, there may be row or column waveguides 4-115 that provide excitation radiation to a row or column of pixels 4-140. Excitation radiation may be coupled into the waveguides using a grating coupler of the above-described embodiments. For example, a grating coupler may be formed on the surface of the bio-optoelectronic chip 4-110 to couple excitation radiation from a focused laser beam into one or more receiving waveguides that connect to the plurality of waveguides 4-115.

The disposable chip structure 4-100 may further include walls 4-120 that are formed around a pixel region on the bio-optoelectronic chip 4-110. The walls 4-120 may be part of a plastic or ceramic casing that supports the bio-optoelectronic chip 4-110. The walls 4-120 may form at least one reservoir 4-130 into which at least one sample may be placed and come into direct contact with reaction chambers 1-130 on the surface of the bio-optoelectronic chip 4-110. The walls 4-120 may prevent the sample in the reservoir 4-130 from flowing into a region containing the optical port 4-150 and grating coupler, for example. In some embodiments, the disposable chip structure 4-100 may further include electrical contacts on an exterior surface of the disposable chip and interconnects within the package, so that electrical connections can be made between circuitry on the bio-optoelectronic chip 4-110 and circuitry in an instrument into which the disposable chip is mounted.

II. Example Bioanalytic Application

An example bioanalytic application is described in which an integrated grating coupler can be used in an advanced analytical instrument. For example, a grating coupler of the present embodiments can be used to improve the ability to automatically maintain alignment of an incident beam to a grating coupler and maintain a constant level of power in downstream waveguides over a period of time.

When mounted in a receptacle of the instrument, a disposable chip 4-100 (like that shown in FIG. 4) can be in optical and electronic communication with optical and electronic apparatus within the advanced analytic instrument. The instrument may include hardware for an external interface, so that data from the chip can be communicated to an external network. In embodiments, the term "optical" may refer to ultra-violet, visible, near-infrared, and short-wavelength infrared spectral bands. Although various types of analyses can be performed on various samples, the following explanation describes genetic sequencing and is also applicable, at least in part, to protein sequencing. However, the invention is not limited to instruments configured for genetic or protein sequencing.

Figures 1A, 5:
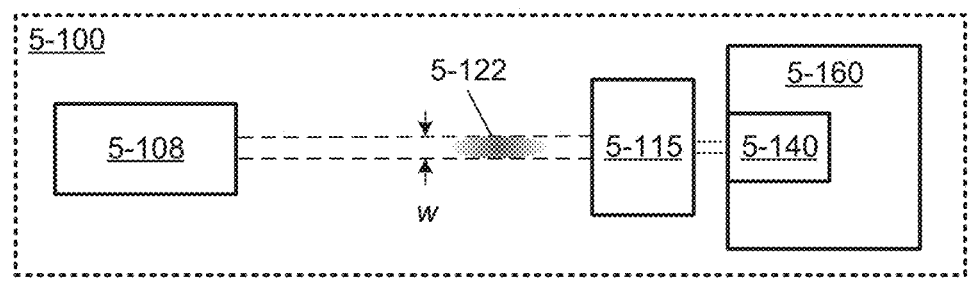

In overview and referring to FIG. 5-1A, a portable, advanced analytic instrument 5-100 can comprise one or more pulsed optical sources 5-108 mounted as a replaceable module within, or otherwise coupled to, the instrument 5-100. The portable analytic instrument 5-100 can include an optical coupling system 5-115 and an analytic system 5-160. The optical coupling system 5-115 can include some combination of optical components (which may include, for example, none, one from among, or more than one component from among the following components: lens, mirror, optical filter, attenuator, beam-steering component, beam shaping component) and be configured to operate on and/or couple output optical pulses 5-122 from the pulsed optical source 5-108 to the analytic system 5-160. The analytic system 5-160 can include a plurality of components that are arranged to direct the optical pulses to at least one reaction chamber for sample analysis, receive one or more optical signals (e.g., fluorescence, backscattered radiation) from the at least one reaction chamber, and produce one or more electrical signals representative of the received optical signals. In some embodiments, the analytic system 5-160 can include one or more photodetectors and may also include signal-processing electronics (e.g., one or more microcontrollers, one or more field-programmable gate arrays, one or more microprocessors, one or more digital signal processors, logic gates, etc.) configured to process the electrical signals from the photodetectors. The analytic system 5-160 can also include data transmission hardware configured to transmit and receive data to and from external devices (e.g., one or more external devices on a network to which the instrument 5-100 can connect via one or more data communications links). In some embodiments, the analytic system 5-160 can be configured to receive a bio-optoelectronic chip 5-140, which holds one or more samples to be analyzed.

Figures 1B, 5:
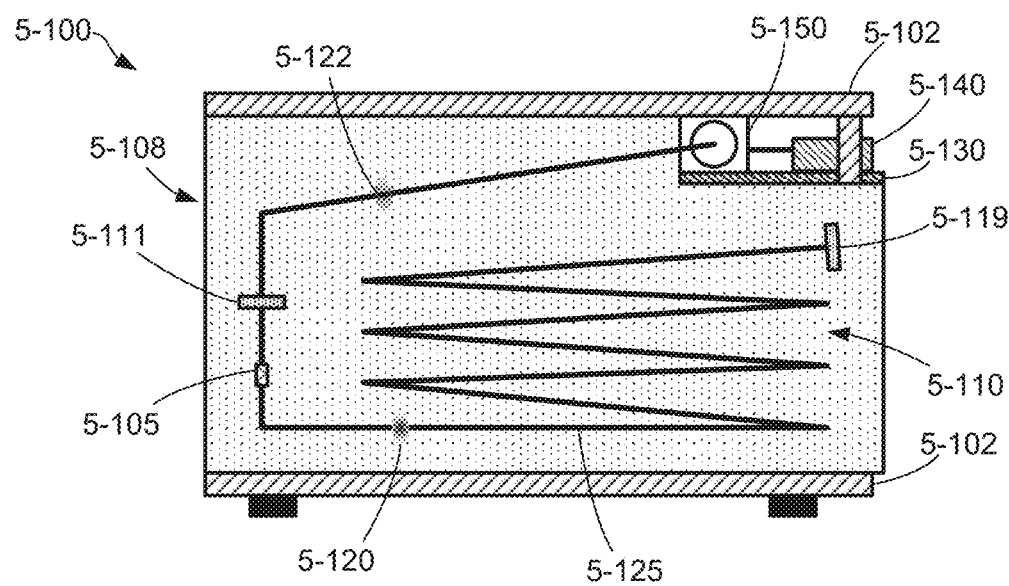
Figures 2, 5:
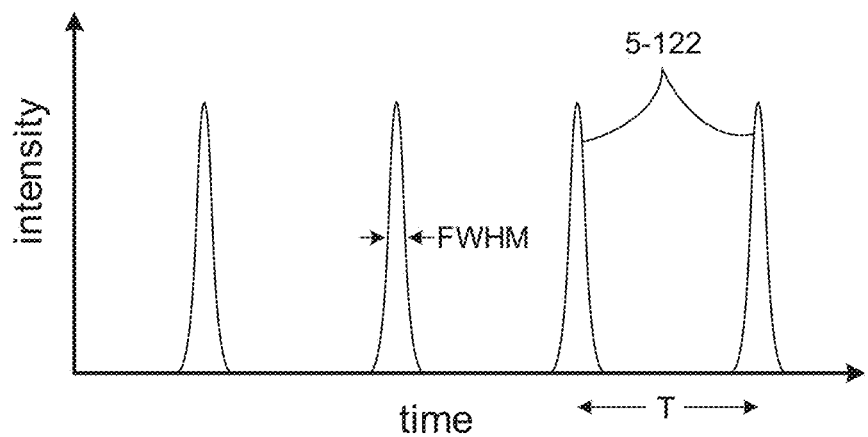
Figures 3, 5:
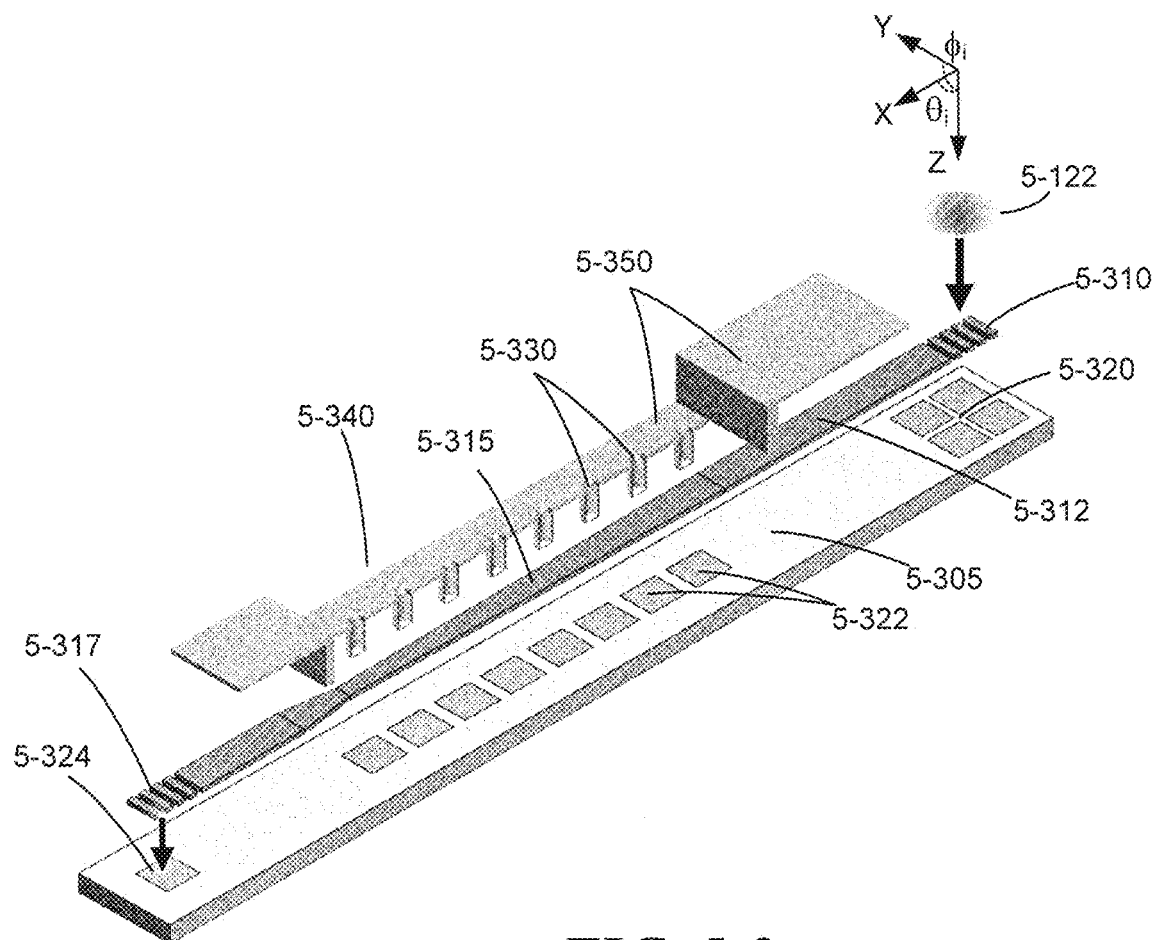
Figures 4, 5:
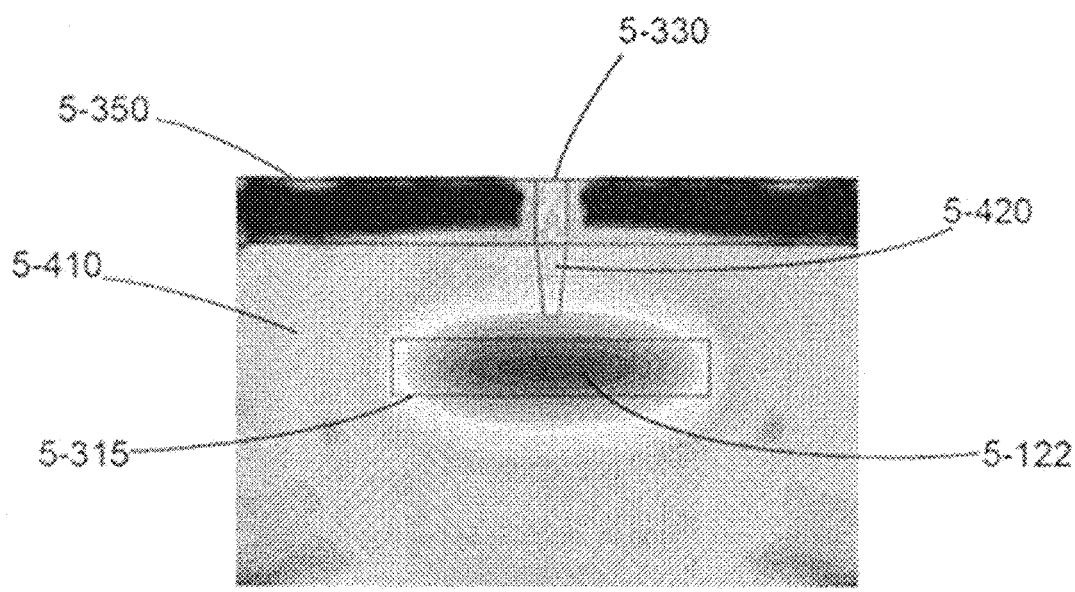
Figure 5:
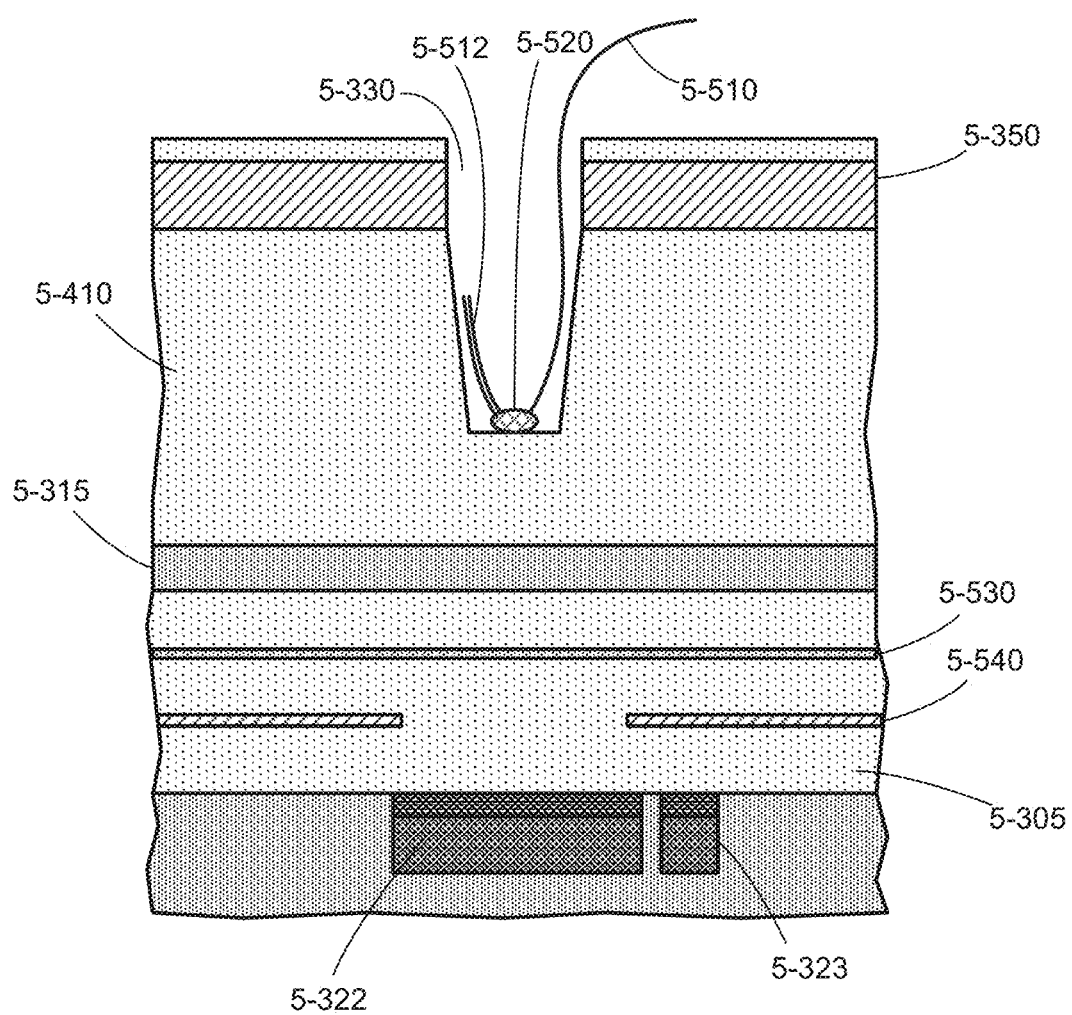

FIG. 5-1B depicts a further detailed example of a portable analytical instrument 5-100 that includes a compact pulsed optical source 5-108. In this example, the pulsed optical source 5-108 comprises a compact, passively mode-locked laser module 5-110. A passively mode-locked laser can produce optical pulses autonomously, without the application of an external pulsed signal. In some implementations, the module can be mounted to an instrument chassis or frame 5-102, and may be located inside an outer casing of the instrument. According to some embodiments, a pulsed optical source 5-108 can include additional components that can be used to operate the optical source and operate on an output beam from the optical source 5-108. A mode-locked laser 5-110 may comprise an element (e.g., saturable absorber, acousto-optic modulator, Kerr lens) in a laser cavity, or coupled to the laser cavity, that induces phase locking of the laser's longitudinal frequency modes. The laser cavity can be defined in part by cavity end mirrors 5-111, 5-119. Such locking of the frequency modes results in pulsed operation of the laser (e.g., an intracavity pulse 5-120 bounces back-and-forth between the cavity end mirrors) and produces a stream of output optical pulses 5-122 from one end mirror 5-111 which is partially transmitting.

In some cases, the analytic instrument 5-100 is configured to receive a removable, packaged, bio-optoelectronic or optoelectronic chip 5-140 (also referred to as a "disposable chip"). The disposable chip can include a bio-optoelectronic chip 4-110, as depicted in FIG. 4 for example, that comprises a plurality of reaction chambers, integrated optical components arranged to deliver optical excitation energy to the reaction chambers, and integrated photodetectors arranged to detect fluorescent emission from the reaction chambers. In some implementations, the chip 5-140 can be disposable after a single use, whereas in other implementations the chip 5-140 can be reused two or more times. When the chip 5-140 is received by the instrument 5-100, it can be in electrical and optical communication with the pulsed optical source 5-108 and with apparatus in the analytic system 5-160. Electrical communication may be made through electrical contacts on the chip's package, for example.

In some embodiments and referring to FIG. 5-1B, the disposable chip 5-140 can be mounted (e.g., via a socket connection) on an electronic circuit board 5-130, such as a printed circuit board (PCB) that can include additional instrument electronics. For example, the PCB 5-130 can include circuitry configured to provide electrical power, one or more clock signals, and control signals to the chip 5-140, and signal-processing circuitry arranged to receive signals representative of fluorescent emission detected from the reaction chambers. Data returned from the chip 5-140 can be processed in part or entirely by electronics on the instrument 5-100, although data may be transmitted via a network connection to one or more remote data processors, in some implementations. The PCB 5-130 can also include circuitry configured to receive feedback signals from the chip relating to optical coupling and power levels of the optical pulses 5-122 coupled into waveguides of the chip 5-140. The feedback signals can be provided to one or both of the pulsed optical source 5-108 and optical system 5-115 to control one or more parameters of the output beam of optical pulses 5-122. In some cases, the PCB 5-130 can provide or route power to the pulsed optical source 5-108 for operating the optical source and related circuitry in the optical source 5-108.

According to some embodiments, the pulsed optical source 5-108 comprises a compact mode-locked laser module 5-110. The mode-locked laser can comprise a gain medium 5-105 (which can be solid-state material in some embodiments), an output coupler 5-111, and a laser-cavity end mirror 5-119. The mode-locked laser's optical cavity can be bound by the output coupler 5-111 and end mirror 5-119. An optical axis 5-125 of the laser cavity can have one or more folds (turns) to increase the length of the laser cavity and provide a desired pulse repetition rate. The pulse repetition rate is determined by the length of the laser cavity (e.g., the time for an optical pulse to make a round-trip within the laser cavity).

In some embodiments, there can be additional optical elements (not shown in FIG. 5-1B) in the laser cavity for beam shaping, wavelength selection, and/or pulse forming. In some cases, the end mirror 5-119 comprises a saturable-absorber mirror (SAM) that induces passive mode locking of longitudinal cavity modes and results in pulsed operation of the mode-locked laser. The mode-locked laser module 5-110 can further include a pump source (e.g., a laser diode, not shown in FIG. 5-1B) for exciting the gain medium 5-105. Further details of a mode-locked laser module 5-110 can be found in U.S. patent application Ser. No. 15/844,469, titled "Compact Mode-Locked Laser Module," filed Dec. 15, 2017, which application is incorporated herein by reference.

When the laser 5-110 is mode locked, an intracavity pulse 5-120 can circulate between the end mirror 5-119 and the output coupler 5-111, and a portion of the intracavity pulse can be transmitted through the output coupler 5-111 as an output pulse 5-122. Accordingly, a train of output pulses 5-122, as depicted in the graph of FIG. 5-2, can be detected at the output coupler as the intracavity pulse 5-120 bounces back-and-forth between the output coupler 5-111 and end mirror 5-119 in the laser cavity.

FIG. 5-2 depicts temporal intensity profiles of the output pulses 5-122, though the illustration is not to scale. In some embodiments, the peak intensity values of the emitted pulses may be approximately equal, and the profiles may have a Gaussian temporal profile, though other profiles such as a $sech^2$ profile may be possible. In some cases, the pulses may not have symmetric temporal profiles and may have other temporal shapes. The duration of each pulse may be characterized by a full-width-half-maximum (FWHM) value, as indicated in FIG. 5-2. According to some embodiments of a mode-locked laser, ultrashort optical pulses can have FWHM values less than 100 picoseconds (ps). In some cases, the FWHM values can be between approximately 5 ps and approximately 30 ps.

The output pulses 5-122 can be separated by regular intervals T. For example, T can be determined by a round-trip travel time between the output coupler 5-111 and cavity end mirror 5-119. According to some embodiments, the pulse-separation interval T can be between about 1 ns and about 30 ns. In some cases, the pulse-separation interval T can be between about 5 ns and about 20 ns, corresponding to a laser-cavity length (an approximate length of the optical axis 5-125 within the laser cavity) between about 0.7 meter and about 3 meters. In embodiments, the pulse-separation interval corresponds to a round trip travel time in the laser cavity, so that a cavity length of 3 meters (round-trip distance of 6 meters) provides a pulse-separation interval T of approximately 20 ns.

According to some embodiments, a desired pulse-separation interval T and laser-cavity length can be determined by a combination of the number of reaction chambers on the chip 5-140, fluorescent emission characteristics, and the speed of data-handling circuitry for reading data from the chip 5-140. In embodiments, different fluorophores can be distinguished by their different fluorescent decay rates or characteristic lifetimes. Accordingly, there needs to be a sufficient pulse-separation interval T to collect adequate statistics for the selected fluorophores to distinguish between their different decay rates. Additionally, if the pulse-separation interval T is too short, the data handling circuitry cannot keep up with the large amount of data being collected by the large number of reaction chambers. Pulse-separation interval T between about 5 ns and about 20 ns is suitable for fluorophores that have decay rates up to about 2 ns and for handling data from between about 60,000 and 10,000,000 reaction chambers.

According to some implementations, a beam-steering module 5-150 can receive output pulses from the pulsed optical source 5-108 and is configured to adjust at least the position and incident angles of the optical pulses onto an optical coupler (e.g., grating coupler) of the chip 5-140. In some cases, the output pulses 5-122 from the pulsed optical source 5-108 can be operated on by a beam-steering module 5-150 to additionally or alternatively change a beam shape and/or beam rotation at an optical coupler on the chip 5-140. In some implementations, the beam-steering module 5-150 can further provide focusing and/or polarization adjustments of the beam of output pulses onto the optical coupler. One example of a beam-steering module is described in U.S. patent application Ser. No. 15/161,088 titled "Pulsed Laser and Bioanalytic System," filed May 20, 2016, which is incorporated herein by reference. Another example of a beam-steering module is described in a separate U.S. Patent application No. 62/435,679, filed Dec. 16, 2016 and titled "Compact Beam Shaping and Steering Assembly," which is incorporated herein by reference.

Referring to FIG. 5-3, the output pulses 5-122 from a pulsed optical source can be coupled into one or more optical waveguides 5-312 on a disposable bio-optoelectronic chip 5-140, for example. In some embodiments, the optical pulses can be coupled to one or more waveguides via one or more grating couplers 5-310, though coupling to an end of one or more optical waveguides on the chip 5-140 can be used in some embodiments. A simplified example of a grating coupler is shown in the illustration. According to some embodiments, a quad detector 5-320 can be located on a semiconductor substrate 5-305 (e.g., a silicon substrate) for aiding in alignment of the beam of optical pulses 5-122 to a grating coupler 5-310. The one or more waveguides 5-312 and reaction chambers or reaction chambers 5-330 can be integrated on the same semiconductor substrate with intervening dielectric layers (e.g., silicon dioxide layers) between the substrate, waveguide, reaction chambers, and photodetectors 5-322.

Each waveguide 5-312 can include a tapered portion 5-315 below the reaction chambers 5-330 to equalize optical power coupled to the reaction chambers along the waveguide. The reducing taper can force more optical energy outside the waveguide's core, increasing coupling to the reaction chambers and compensating for optical losses along the waveguide, including losses for radiation coupling into the reaction chambers. A second grating coupler 5-317 can be located at an end of each waveguide to direct optical energy to an integrated photodiode 5-324. The integrated photodiode can detect an amount of power coupled down a waveguide and provide a detected signal to feedback circuitry that controls the beam-steering module 5-150, for example.

The reaction chambers 5-330 or reaction chambers 5-330 can be aligned with the tapered portion 5-315 of the waveguide and recessed in a tub 5-340. There can be photodetectors 5-322 located on the semiconductor substrate 5-305 for each reaction chamber 5-330. In some embodiments, a semiconductor absorber (shown in FIG. 5-5 as an optical filter 5-530) may be located between the waveguide and a photodetector 5-322 at each pixel. A metal coating and/or multilayer coating 5-350 can be formed around the reaction chambers and above the waveguide to prevent optical excitation of fluorophores that are not in the reaction chambers (e.g., dispersed in a solution above the reaction chambers). The metal coating and/or multilayer coating 5-350 may be raised beyond edges of the tub 5-340 to reduce absorptive losses of the optical energy in the waveguide 5-312 at the input and output ends of each waveguide.

There can be a plurality of rows of waveguides, reaction chambers, and time-binning photodetectors on the chip 5-140. For example, there can be 128 rows, each having 512 reaction chambers, for a total of 65,536 reaction chambers in some implementations. Other implementations may include fewer or more reaction chambers, and may include other layout configurations. Optical power from the pulsed optical source 5-108 can be distributed to the multiple waveguides via one or more star couplers or multi-mode interference couplers, or by any other means, located between an optical coupler 5-310 to the chip 5-140 and the plurality of waveguides 5-312.

FIG. 5-4 illustrates optical energy coupling from an optical pulse 5-122 within a tapered portion of waveguide 5-315 to a reaction chamber 5-330. The drawing has been produced from an electromagnetic field simulation of the optical wave that accounts for waveguide dimensions, reaction chamber dimensions, the different materials' optical properties, and the distance of the tapered portion of waveguide 5-315 from the reaction chamber 5-330. The waveguide can be formed from silicon nitride in a surrounding medium 5-410 of silicon dioxide, for example. The waveguide, surrounding medium, and reaction chamber can be formed by microfabrication processes described in U.S. application Ser. No. 14/821,688, filed Aug. 7, 2015, titled "Integrated Device for Probing, Detecting and Analyzing Molecules." According to some embodiments, an evanescent optical field 5-420 couples optical energy transported by the waveguide to the reaction chamber 5-330.

A non-limiting example of a biological reaction taking place in a reaction chamber 5-330 is depicted in FIG. 5-5. The example depicts sequential incorporation of nucleotides or nucleotide analogs into a growing strand that is complementary to a target nucleic acid. The sequential incorporation can take place in a reaction chamber 5-330, and can be detected by an advanced analytic instrument to sequence DNA. The reaction chamber can have a depth between about 150 nm and about 250 nm and a diameter between about 80 nm and about 160 nm. A metallization layer 5-540 (e.g., a metallization for an electrical reference potential) can be patterned above a photodetector 5-322 to provide an aperture or iris that blocks stray radiation from adjacent reaction chambers and other unwanted radiation sources. According to some embodiments, polymerase 5-520 can be located within the reaction chamber 5-330 (e.g., attached to a base of the chamber). The polymerase can take up a target nucleic acid 5-510 (e.g., a portion of nucleic acid derived from DNA), and sequence a growing strand of complementary nucleic acid to produce a growing strand of DNA 5-512. Nucleotides or nucleotide analogs labeled with different fluorophores can be dispersed in a solution above and within the reaction chamber.

Figures 5, 6:
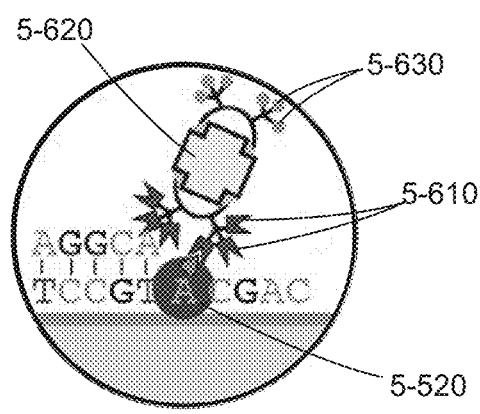

When a labeled nucleotide or nucleotide analog 5-610 is incorporated into a growing strand of complementary nucleic acid, as depicted in FIG. 5-6, one or more attached fluorophores 5-630 can be repeatedly excited by pulses of optical energy coupled into the reaction chamber 5-330 from the waveguide 5-315. In some embodiments, the fluorophore or fluorophores 5-630 can be attached to one or more nucleotides or nucleotide analogs 5-610 with any suitable linker 5-620. An incorporation event may last for a period of time up to about 100 ms. During this time, pulses of fluorescent emission resulting from excitation of the fluorophore(s) by pulses from the mode-locked laser can be detected with a time-binning photodetector 5-322, for example. In some embodiments, there can be one or more additional integrated electronic devices 5-323 at each pixel for signal handling (e.g., amplification, read-out, routing, signal preprocessing, etc.). According to some embodiments, each pixel can include at least one optical filter 5-530 (e.g., a semiconductor absorber) that passes fluorescent emission and reduces transmission of radiation from the excitation pulse. Some implementations may not use the optical filter 5-530. By attaching fluorophores with different emission characteristics (e.g., fluorescent decay rates, intensity, fluorescent wavelength) to the different nucleotides (A,C,G,T), detecting and distinguishing the different emission characteristics while the strand of DNA 5-512 incorporates a nucleic acid and enables determination of the genetic sequence of the growing strand of DNA.

Figures 5, 6, 7:
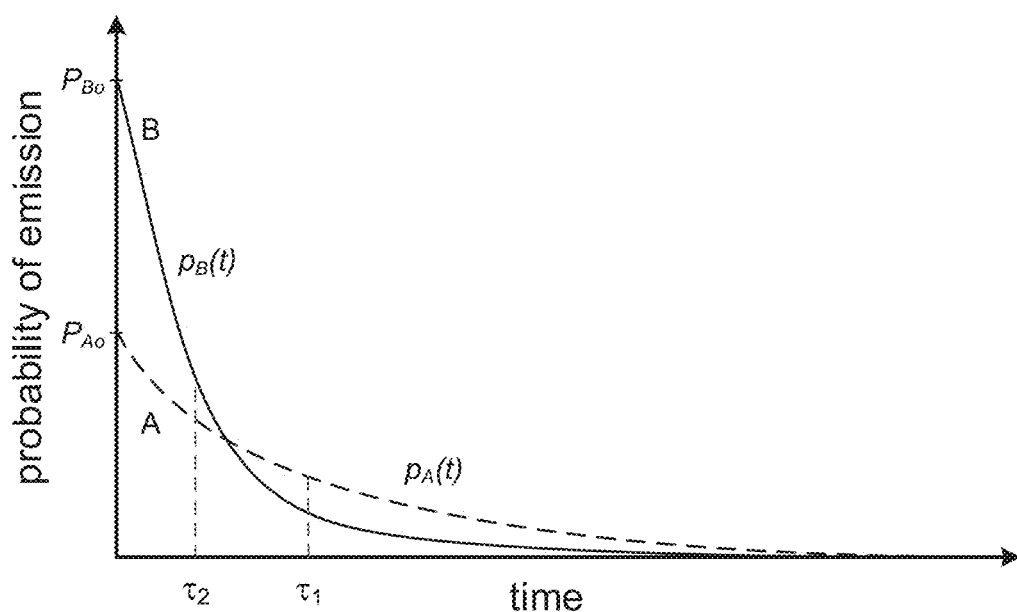
Figures 5, 6, 7, 8:
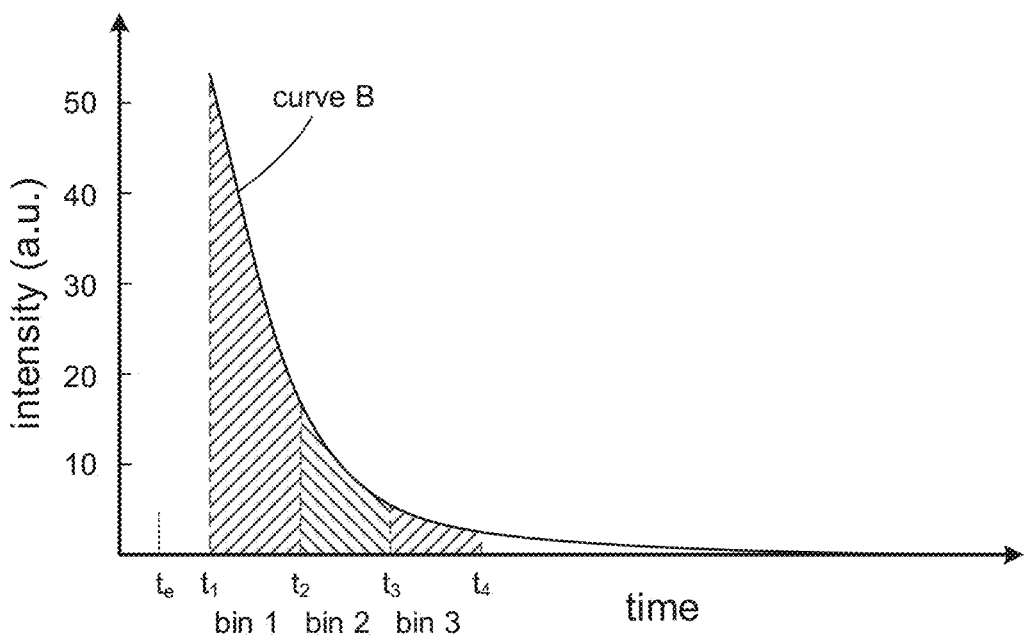
Figures 5, 6, 7, 8, 9:
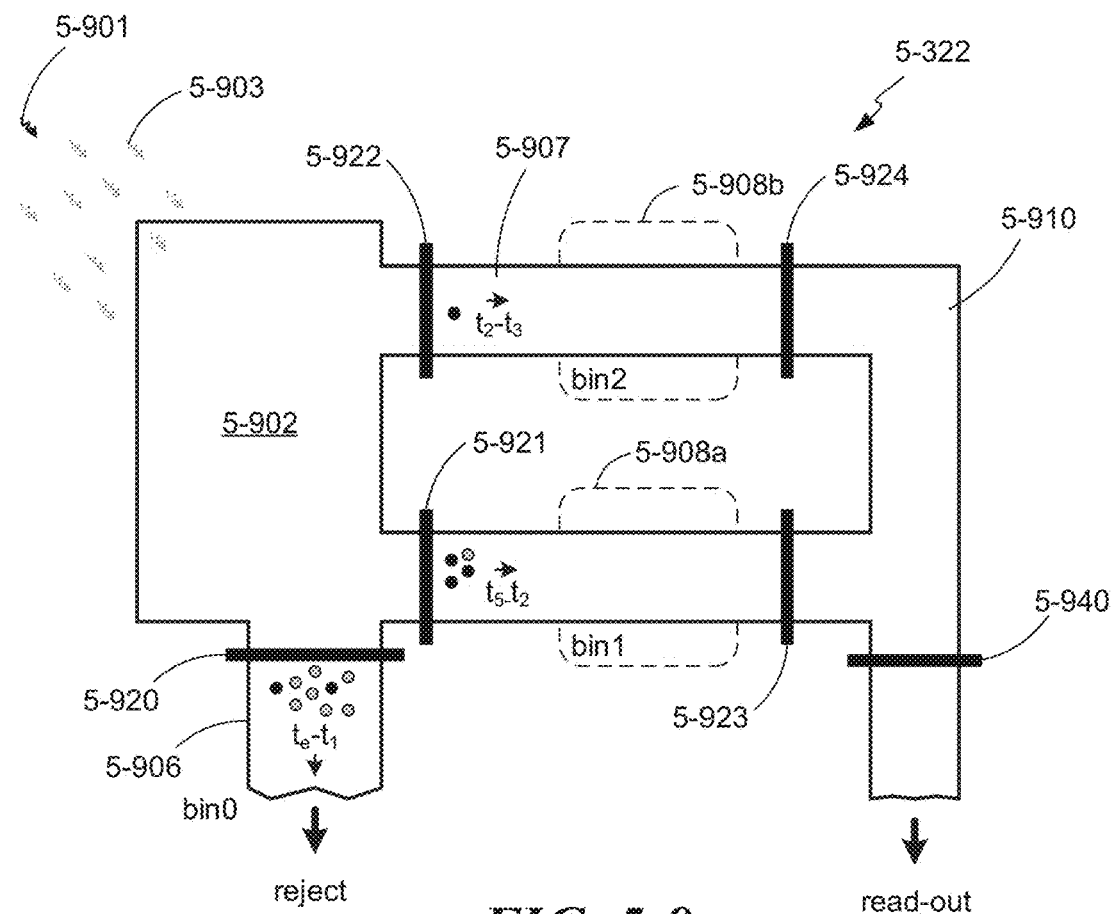
Figures 5, 6, 7, 8, 9, 10, 10A:
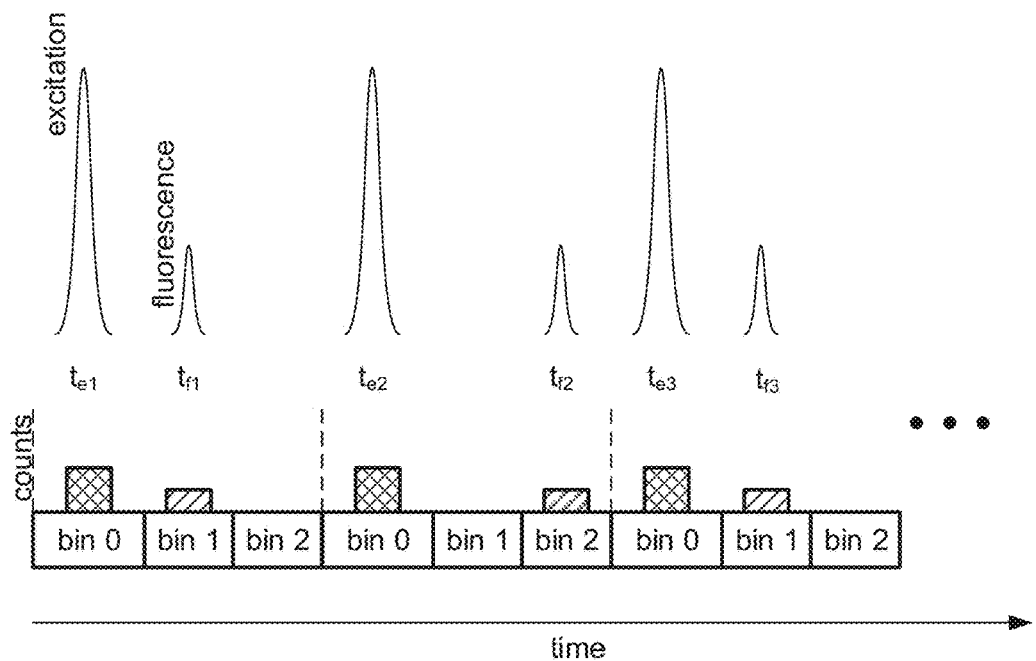
Figures 5, 6, 7, 8, 9, 10, 10B:
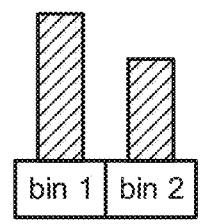
Figures 5, 6, 7, 8, 9, 10, 11, 11A:
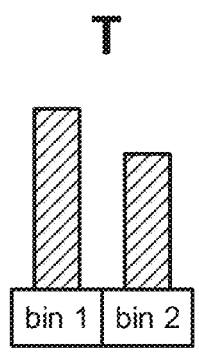
Figures 5, 6, 7, 8, 9, 10, 11, 11B:
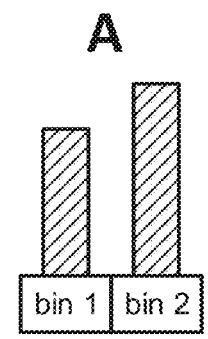
Figures 5, 6, 7, 8, 9, 10, 11, 11C:
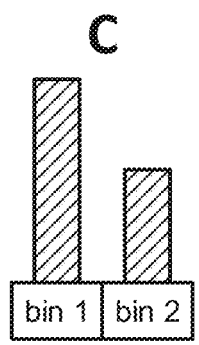
Figures 5, 6, 7, 8, 9, 10, 11, 11D:
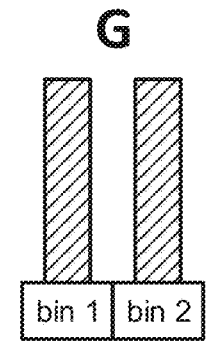

According to some embodiments, an advanced analytic instrument 5-100 that is configured to analyze samples based on fluorescent emission characteristics can detect differences in fluorescent lifetimes and/or intensities between different fluorescent molecules, and/or differences between lifetimes and/or intensities of the same fluorescent molecules in different environments. By way of explanation, FIG. 5-7 plots two different fluorescent emission probability curves (A and B), which can be representative of fluorescent emission from two different fluorescent molecules, for example. With reference to curve A (dashed line), after being excited by a short or ultrashort optical pulse, a probability $p_A(t)$ of a fluorescent emission from a first molecule may decay with time, as depicted. In some cases, the decrease in the probability of a photon being emitted over time can be represented by an exponential decay function $p_A(t)=P_{Ao}e^{-t/\tau_1}$, where $P_{Ao}$ is an initial emission probability and $\tau_1$ is a temporal parameter associated with the first fluorescent molecule that characterizes the emission decay probability. $\tau_1$ may be referred to as the "fluorescence lifetime," "emission lifetime," or "lifetime" of the first fluorescent molecule. In some cases, the value of $\tau_1$ can be altered by a local environment of the fluorescent molecule. Other fluorescent molecules can have different emission characteristics than that shown in curve A. For example, another fluorescent molecule can have a decay profile that differs from a single exponential decay, and its lifetime can be characterized by a half-life value or some other metric.

A second fluorescent molecule may have a decay profile $p_B(t)$ that is exponential, but has a measurably different lifetime $\tau_2$, as depicted for curve B in FIG. 5-7. In the example shown, the lifetime for the second fluorescent molecule of curve B is shorter than the lifetime for curve A, and the probability of emission $p_B(t)$ is higher sooner after excitation of the second molecule than for curve A. Different fluorescent molecules can have lifetimes or half-life values ranging from about 0.1 ns to about 20 ns, in some embodiments.

Differences in fluorescent emission lifetimes can be used to discern between the presence or absence of different fluorescent molecules and/or to discern between different environments or conditions to which a fluorescent molecule is subjected. In some cases, discerning fluorescent molecules based on lifetime (rather than emission wavelength, for example) can simplify aspects of an analytical instrument 5-100. As an example, wavelength-discriminating optics (such as wavelength filters, dedicated detectors for each wavelength, dedicated pulsed optical sources at different wavelengths, and/or diffractive optics) can be reduced in number or eliminated when discerning fluorescent molecules based on lifetime. In some cases, a single pulsed optical source operating at a single characteristic wavelength can be used to excite different fluorescent molecules that emit within a same wavelength region of the optical spectrum but have measurably different lifetimes. An analytic system that uses a single pulsed optical source, rather than multiple sources operating at different wavelengths, to excite and discern different fluorescent molecules emitting in a same wavelength region can be less complex to operate and maintain, more compact, and can be manufactured at lower cost.

Although analytic systems based on fluorescent lifetime analysis can have certain benefits, the amount of information obtained by an analytic system and/or detection accuracy can be increased by allowing for additional detection techniques. For example, some analytic systems 5-160 can additionally be configured to discern one or more properties of a specimen based on fluorescent wavelength and/or fluorescent intensity.

Referring again to FIG. 5-7, according to some embodiments, different fluorescent lifetimes can be distinguished with a photodetector that is configured to time-bin fluorescent emission events following excitation of a fluorescent molecule. The time binning can occur during a single charge-accumulation cycle for the photodetector. A charge-accumulation cycle is an interval between read-out events during which photo-generated carriers are accumulated in bins of the time-binning photodetector. The concept of determining fluorescent lifetime by time-binning of emission events is introduced graphically in FIG. 5-8. At time $t_e$ just prior to $t_1$, a fluorescent molecule or ensemble of fluorescent molecules of a same type (e.g., the type corresponding to curve B of FIG. 5-7) is (are) excited by a short or ultrashort optical pulse. For a large ensemble of molecules, the intensity of emission can have a time profile similar to curve B, as depicted in FIG. 5-8.

For a single molecule or a small number of molecules, however, the emission of fluorescent photons occurs according to the statistics of curve B in FIG. 5-7, for this example. A time-binning photodetector 5-322 can accumulate carriers generated from emission events into discrete time bins. Three bins are indicated in FIG. 5-8, though fewer bins or more bins may be used in embodiments. The bins are temporally resolved with respect to the excitation time $t_e$ of the fluorescent molecule(s). For example, a first bin can accumulate carriers produced during an interval between times $t_1$ and $t_2$, occurring after the excitation event at time $t_e$. A second bin can accumulate carriers produced during an interval between times $t_2$ and $t_3$, and a third bin can accumulate carriers produced during an interval between times $t_3$ and $t_4$. When a large number of emission events are summed, carriers accumulated in the time bins can approximate the decaying intensity curve shown in FIG. 5-8, and the binned signals can be used to distinguish between different fluorescent molecules or different environments in which a fluorescent molecule is located.

Examples of a time-binning photodetector 5-322 are described in U.S. patent application Ser. No. 14/821,656, filed Aug. 7, 2015, titled "Integrated Device for Temporal Binning of Received Photons" and in U.S. patent application Ser. No. 15/852,571, filed Dec. 22, 2017, titled "Integrated Photodetector with Direct Binning Pixel," which are both incorporated herein by reference in their entirety. For explanation purposes, a non-limiting embodiment of a time-binning photodetector is depicted in FIG. 5-9. A single time-binning photodetector 5-322 can comprise a photon-absorption/carrier-generation region 5-902, a carrier-discharge channel 5-906, and a plurality of carrier-storage bins 5-908a, 5-908b all formed on a semiconductor substrate. Carrier-transport channels 5-907 can connect between the photon-absorption/carrier-generation region 5-902 and carrier-storage bins 5-908a, 5-908b. In the illustrated example, two carrier-storage bins are shown, but there may be more or fewer. There can be a read-out channel 5-910 connected to the carrier-storage bins. The photon-absorption/carrier-generation region 5-902, carrier-discharge channel 5-906, carrier-storage bins 5-908a, 5-908b, and read-out channel 5-910 can be formed by doping the semiconductor locally and/or forming adjacent insulating regions to provide photodetection capability, confinement, and transport of carriers. A time-binning photodetector 5-322 can also include a plurality of electrodes 5-920, 5-921, 5-922, 5-923, 5-924 formed on the substrate that are configured to generate electric fields in the device for transporting carriers through the device.

In operation, a portion of an excitation pulse 5-122 from a pulsed optical source 5-108 (e.g., a mode-locked laser) is delivered to a reaction chamber 5-330 over the time-binning photodetector 5-322. Initially, some excitation radiation photons 5-901 may arrive at the photon-absorption/carrier-generation region 5-902 and produce carriers (shown as light-shaded circles). There can also be some fluorescent emission photons 5-903 that arrive with the excitation radiation photons 5-901 and produce corresponding carriers (shown as dark-shaded circles). Initially, the number of carriers produced by the excitation radiation can be too large compared to the number of carriers produced by the fluorescent emission. The initial carriers produced during a time interval $|t_e-t_1|$ can be rejected by gating them into a carrier-discharge channel 5-906 with a first electrode 5-920, for example.

At a later times mostly fluorescent emission photons 5-903 arrive at the photon-absorption/carrier-generation region 5-902 and produce carriers (indicated a dark-shaded circles) that provide useful and detectable signal that is representative of fluorescent emission from the reaction chamber 5-330. According to some detection methods, a second electrode 5-921 and third electrode 5-923 can be gated at a later time to direct carriers produced at a later time (e.g., during a second time interval $|t_1-t_2|$) to a first carrier-storage bin 5-908a. Subsequently, a fourth electrode 5-922 and fifth electrode 5-924 can be gated at a later time (e.g., during a third time interval $|t_2-t_3|$) to direct carriers to a second carrier-storage bin 5-908b. Charge accumulation can continue in this manner after excitation pulses for a large number of excitation pulses to accumulate an appreciable number of carriers and signal level in each carrier-storage bin 5-908a, 5-908b. At a later time, the signal can be read out from the bins. In some implementations, the time intervals corresponding to each storage bin are at the sub-nanosecond time scale, though longer time scales can be used in some embodiments (e.g., in embodiments where fluorophores have longer decay times).

The process of generating and time-binning carriers after an excitation event (e.g., excitation pulse from a pulsed optical source) can occur once after a single excitation pulse or be repeated multiple times after multiple excitation pulses during a single charge-accumulation cycle for the time-binning photodetector 5-322. After charge accumulation is complete, carriers can be read out of the storage bins via the read-out channel 5-910. For example, an appropriate biasing sequence can be applied to electrodes 5-923, 5-924 and at least to electrode 5-940 to remove carriers from the storage bins 5-908a, 5-908b. The charge accumulation and read-out processes can occur in a massively parallel operation on the chip 5-140 resulting in frames of data.

Although the described example in connection with FIG. 5-9 includes multiple charge storage bins 5-908a, 5-908b in some cases a single charge storage bin may be used instead. For example, only bin 1 may be present in a time-binning photodetector 5-322. In such a case, a single storage bins 5-908a can be operated in a variable time-gated manner to look at different time intervals after different excitation events. For example, after pulses in a first series of excitation pulses, electrodes for the storage bin 5-908a can be gated to collect carriers generated during a first time interval (e.g., during the second time interval $|t_1-t_2|$), and the accumulated signal can be read out after a first predetermined number of pulses. After pulses in a subsequent series of excitation pulses at the same reaction chamber, the same electrodes for the storage bin 5-908a can be gated to collect carriers generated during a different interval (e.g., during the third time interval $|t_2-t_3|$), and the accumulated signal can be read out after a second predetermined number of pulses. Carriers could be collected during later time intervals in a similar manner if needed. In this manner, signal levels corresponding to fluorescent emission during different time periods after arrival of an excitation pulse at a reaction chamber can be produced using a single carrier-storage bin.

Regardless of how charge accumulation is carried out for different time intervals after excitation, signals that are read out can provide a histogram of bins that are representative of the fluorescent emission decay characteristics, for example. An example process is illustrated in FIG. 5-10A and FIG. 5-10B, for which two charge-storage bins are used to acquire fluorescent emission from the reaction chambers. The histogram's bins can indicate a number of photons detected during each time interval after excitation of the fluorophore(s) in a reaction chamber 5-330. In some embodiments, signals for the bins will be accumulated following a large number of excitation pulses, as depicted in FIG. 5-10A. The excitation pulses can occur at times $t_{e1}$, $t_{e2}$, $t_{e3}$, ... $t_{eN}$ which are separated by the pulse interval time T. In some cases, there can be between $10^5$ and $10^7$ excitation pulses 5-122 (or portions thereof) applied to a reaction chamber during an accumulation of signals in the electron-storage bins for a single event being observed in the reaction chamber (e.g., a single nucleotide incorporation event in DNA analysis). In some embodiments, one bin (bin 0) can be configured to detect an amplitude of excitation energy delivered with each optical pulse, and may be used as a reference signal (e.g., to normalize data). In other cases, the excitation pulse amplitude may be stable, determined one or more times during signal acquisition, and not determined after each excitation pulse so that there is no bin 0 signal acquisition after each excitation pulse. In such cases, carriers produced by an excitation pulse can be rejected and dumped from the photon-absorption/carrier-generation region 5-902 as described above in connection with FIG. 5-9.

In some implementations, only a single photon may be emitted from a fluorophore following an excitation event, as depicted in FIG. 5-10A. After a first excitation event at time $t_{e1}$, the emitted photon at time $t_{d1}$ may occur within a first time interval (e.g., between times $t_1$ and $t_2$), so that the resulting electron signal is accumulated in the first electron-storage bin (contributes to bin 1). In a subsequent excitation event at time $t_{e2}$, the emitted photon at time tee may occur within a second time interval (e.g., between times $t_2$ and $t_3$), so that the resulting electron signal contributes to bin 2. After a next excitation event at time tea, a photon may emit at a time $t_{f3}$ occurring within the first time interval.

In some implementations, there may not be a fluorescent photon emitted and/or detected after each excitation pulse received at a reaction chamber 5-330. In some cases, there can be as few as one fluorescent photon that is detected at a reaction chamber for every 10,000 excitation pulses delivered to the reaction chamber. One advantage of implementing a mode-locked laser 5-110 as the pulsed excitation source 5-108 is that a mode-locked laser can produce short optical pulses having high intensity and quick turn-off times at high pulse-repetition rates (e.g., between 50 MHz and 250 MHz). With such high pulse-repetition rates, the number of excitation pulses within a 10 millisecond charge-accumulation interval can be 50,000 to 250,000, so that detectable signal can be accumulated.

After a large number of excitation events and carrier accumulations, the carrier-storage bins of the time-binning photodetector 5-322 can be read out to provide a multi-valued signal (e.g., a histogram of two or more values, an N-dimensional vector, etc.) for a reaction chamber. The signal values for each bin can depend upon the decay rate of the fluorophore. For example and referring again to FIG. 5-8, a fluorophore having a decay curve B will have a higher ratio of signal in bin 1 to bin 2 than a fluorophore having a decay curve A. The values from the bins can be analyzed and compared against calibration values, and/or each other, to determine the particular fluorophore present. For a sequencing application, identifying the fluorophore can determine the nucleotide or nucleotide analog that is being incorporated into a growing strand of DNA, for example. For other applications, identifying the fluorophore can determine an identity of a molecule or specimen of interest, which may be linked to the fluorophore or marked with a fluorophore.

To further aid in understanding the signal analysis, the accumulated, multi-bin values can be plotted as a histogram, as depicted in FIG. 5-10B for example, or can be recorded as a vector or location in N-dimensional space. Calibration runs can be performed separately to acquire calibration values for the multi-valued signals (e.g., calibration histograms) for four different fluorophores linked to the four nucleotides or nucleotide analogs. As an example, the calibration histograms may appear as depicted in FIG. 5-11A (fluorescent label associated with the T nucleotide), FIG. 5-11B (fluorescent label associated with the A nucleotide), FIG. 5-11C (fluorescent label associated with the C nucleotide), and FIG. 5-11D (fluorescent label associated with the G nucleotide). A comparison of the measured multi-valued signal (corresponding to the histogram of FIG. 5-10B) to the calibration multi-valued signals can determine the identity "T" (FIG. 5-11A) of the nucleotide or nucleotide analog being incorporated into the growing strand of DNA.

In some implementations, fluorescent intensity can be used additionally or alternatively to distinguish between different fluorophores. For example, some fluorophores may emit at significantly different intensities or have a significant difference in their probabilities of excitation (e.g., at least a difference of about 35%) even though their decay rates may be similar. By referencing binned signals (bins 5-3) to measured excitation energy and/or other acquired signals, it can be possible to distinguish different fluorophores based on intensity levels.

In some embodiments, different numbers of fluorophores of the same type can be linked to different nucleotides or nucleotide analogs, so that the nucleotides can be identified based on fluorophore intensity. For example, two fluorophores can be linked to a first nucleotide (e.g., "C") or nucleotide analog and four or more fluorophores can be linked to a second nucleotide (e.g., "T") or nucleotide analog. Because of the different numbers of fluorophores, there may be different excitation and fluorophore emission probabilities associated with the different nucleotides. For example, there may be more emission events for the "T" nucleotide or nucleotide analog during a signal accumulation interval, so that the apparent intensity of the bins is significantly higher than for the "C" nucleotide or nucleotide analog.

Distinguishing nucleotides or any other biological or chemical specimens based on fluorophore decay rates and/or fluorophore intensities enables a simplification of the optical excitation and detection systems in an analytical instrument 5-100. For example, optical excitation can be performed with a single-wavelength source (e.g., a source producing one characteristic wavelength rather than multiple sources or a source operating at multiple different characteristic wavelengths). Additionally, wavelength-discriminating optics and filters may not be needed in the detection system to distinguish between fluorophores of different wavelengths. Also, a single photodetector can be used for each reaction chamber to detect emission from different fluorophores.

The phrase "characteristic wavelength" or "wavelength" is used to refer to a central or predominant wavelength within a limited bandwidth of radiation (e.g., a central or peak wavelength within a 20 nm bandwidth output by a pulsed optical source). In some cases, "characteristic wavelength" or "wavelength" may be used to refer to a peak wavelength within a total bandwidth of radiation output by a source.

Fluorophores having emission wavelengths in a range between about 560 nm and about 900 nm can provide adequate amounts of fluorescence to be detected by a time-binning photodetector (which can be fabricated on a silicon wafer using CMOS processes). These fluorophores can be linked to biological molecules of interest, such as nucleotides or nucleotide analogs for genetic sequencing applications. Fluorescent emission in this wavelength range can be detected with higher responsivity in a silicon-based photodetector than fluorescence at longer wavelengths. Additionally, fluorophores and associated linkers in this wavelength range may not interfere with incorporation of the nucleotides or nucleotide analogs into growing strands of DNA. In some implementations, fluorophores having emission wavelengths in a range between about 560 nm and about 660 nm can be optically excited with a single-wavelength source. An example fluorophore in this range is Alexa Fluor 647, available from Thermo Fisher Scientific Inc. of Waltham, Mass.

Excitation energy at shorter wavelengths (e.g., between about 500 nm and about 650 nm) may be used to excite fluorophores that emit at wavelengths between about 560 nm and about 900 nm. In some embodiments, the time-binning photodetectors can efficiently detect longer-wavelength emission from the reaction chambers, e.g., by incorporating other materials, such as Ge, into the photodetectors' active regions.

IV. Conclusion

Having thus described several aspects of several embodiments of system architecture for an advanced analytic system 5-100, it is to be appreciated that various alterations, modifications, and improvements will readily occur to those skilled in the art. Such alterations, modifications, and improvements are intended to be part of this disclosure, and are intended to be within the spirit and scope of the invention. While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art.

While various inventive embodiments have been described and illustrated, those of ordinary skill in the art will readily envision a variety of other means and/or structures for performing the function and/or obtaining the results and/or one or more of the advantages described, and each of such variations and/or modifications is deemed to be within the scope of the inventive embodiments described. More generally, those skilled in the art will readily appreciate that all parameters, dimensions, materials, and configurations described are meant to be examples and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure may be directed to each individual feature, system, system upgrade, and/or method described. In addition, any combination of two or more such features, systems, and/or methods, if such features, systems, system upgrade, and/or methods are not mutually inconsistent, is included within the inventive scope of the present disclosure.

Further, though some advantages of the present invention may be indicated, it should be appreciated that not every embodiment of the invention will include every described advantage. Some embodiments may not implement any features described as advantageous. Accordingly, the foregoing description and drawings are by way of example only.

All literature and similar material cited in this application, including, but not limited to, patents, patent applications, articles, books, treatises, and web pages, regardless of the format of such literature and similar materials, are expressly incorporated by reference in their entirety. In the event that one or more of the incorporated literature and similar materials differs from or contradicts this application, including but not limited to defined terms, term usage, described techniques, or the like, this application controls.

The section headings used are for organizational purposes only and are not to be construed as limiting the subject matter described in any way.

Also, the technology described may be embodied as a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used, should be understood to control over dictionary definitions, definitions in documents incorporated by reference, and/or ordinary meanings of the defined terms.

Numerical values and ranges may be described in the specification and claims as approximate or exact values or ranges. For example, in some cases the terms "about," "approximately," and "substantially" may be used in reference to a value. Such references are intended to encompass the referenced value as well as plus and minus reasonable variations of the value. For example, a phrase "between about 10 and about 20" is intended to mean "between exactly 10 and exactly 20" in some embodiments, as well as "between 10±δ1 and 20±δ2" in some embodiments. The amount of variation δ1, δ2 for a value may be less than 5% of the value in some embodiments, less than 10% of the value in some embodiments, and yet less than 20% of the value in some embodiments. In embodiments where a large range of values is given, e.g., a range including two or more orders of magnitude, the amount of variation δ1, δ2 for a value could be as high as 50%. For example, if an operable range extends from 2 to 200, "approximately 80" may encompass values between 40 and 120 and the range may be as large as between 1 and 300. When exact values are intended, the term "exactly" is used, e.g., "between exactly 2 and exactly 200."

The term "adjacent" may refer to two elements arranged within close proximity to one another (e.g., within a distance that is less than about one-fifth of a transverse or vertical dimension of a larger of the two elements). In some cases there may be intervening structures or layers between adjacent elements. In some cases adjacent elements may be immediately adjacent to one another with no intervening structures or elements.

The indefinite articles "a" and "an," as used in the specification and in the claims, unless clearly indicated to the contrary, should be understood to mean "at least one."

The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

The invention claimed is:

1. An integrated device comprising:
   a grating disposed on a substrate and arranged to couple radiation incident on the grating into a plurality of optical waveguides disposed on the substrate;
   a first inlet to a first receiving region of the plurality of optical waveguides;
   a second inlet to a second receiving region of the plurality of optical waveguides, wherein the second inlet is offset a first amount with respect to the first inlet in a first direction approximately perpendicular to lines of the grating;
   a plurality of pixels formed on the substrate, each including a reaction chamber configured to receive a sample for genetic or protein sequencing, detection and/or measurement;
   wherein the waveguides are configured to provide excitation radiation to the reaction chambers; and
   wherein each waveguide of the plurality of optical waveguides comprises a first dielectric material embedded within a second dielectric material having a lower index of refraction than the first dielectric material.

2. The integrated device of claim 1, further comprising a third inlet to a third receiving region of the plurality of optical waveguides, wherein the third inlet is offset a second amount with respect to the first inlet in a second direction approximately perpendicular to lines of the grating, the second direction opposite the first direction.

3. The integrated device of claim 2, wherein a first portion of the grating located adjacent to the first inlet has a first periodicity that is different than a second periodicity of a second portion of the grating located adjacent to a fourth inlet to a fourth receiving region of the plurality of optical waveguides.

4. The integrated device of claim 1, further comprising:
   a first optical sensor arranged to receive radiation coupled into the first waveguide; and a second optical sensor arranged to receive radiation coupled into the second waveguide.

5. The integrated device of claim 1 wherein the first inlet is at a first position angle to the first receiving region and the second inlet is at a second position angle to the second receiving region.

6. The integrated device of claim 1, wherein the first inlet has a different width than the second inlet.

7. The integrated device of claim 1, wherein the first amount of the offset is any value between 1 micron and 20 microns.

8. The integrated device of claim 1, wherein the grating comprises a plurality of separated grating portions.

9. The integrated device of claim 1, wherein lines of the grating comprise a first dielectric material embedded within a second dielectric material having a lower index of refraction than the first dielectric material.

10. The integrated device of claim 1, wherein lines of the grating comprise a metal.

11. The integrated device of claim 9, wherein the first dielectric material is a same material and layer that is used to form the plurality of optical waveguides.

12. The integrated device of claim 1, wherein the first dielectric material is silicon nitride.

13. The integrated device of claim 1, wherein the second receiving region has a tapered width.

14. The integrated device of claim 13, wherein a width of the first inlet is different from a width of the second inlet.

15. An integrated device comprising:
a grating disposed on a substrate and arranged to couple radiation incident on the grating into a plurality of optical waveguides disposed on the substrate;
a first inlet to a first receiving region of the plurality of optical waveguides; and
a second inlet to a second receiving region of the plurality of optical waveguides, wherein the second inlet is offset a first amount with respect to the first inlet in a first direction approximately perpendicular to lines of the grating; and
 a plurality of pixels formed on the substrate, each including a reaction chamber and an optical sensor, wherein at least one waveguide is configured to provide excitation radiation to a plurality of the reaction chambers;
 wherein each reaction chamber is configured to receive a sample for genetic sequencing or protein sequencing, detection and/or measurement.

16. An integrated device comprising:
a grating disposed on a substrate and arranged to couple radiation incident on the grating into a plurality of optical waveguides disposed on the substrate;
a first inlet to a first waveguide of the plurality of optical waveguides;
a second inlet to a second waveguide of the plurality of optical waveguides, wherein a first portion of the grating located adjacent to the first inlet has a different periodicity than a second portion of the grating located adjacent to the second inlet; and
 a plurality of pixels formed on the substrate, each including a reaction chamber configured to receive a sample for genetic or protein sequencing, detection and/or measurement;
wherein the waveguides are configured to provide excitation radiation to the reaction chambers; and
 wherein each waveguide of the plurality of optical waveguides comprises a first dielectric material embedded within a second dielectric material having a lower index of refraction than the first dielectric material.

17. The integrated device of claim 16, further comprising:
a first optical sensor arranged to receive radiation coupled into the first waveguide; and
a second optical sensor arranged to receive radiation coupled into the second waveguide.

18. An integrated device comprising:
a grating disposed on a substrate and arranged to couple radiation incident on the grating into a plurality of optical waveguides disposed on the substrate;
a first inlet to a first receiving region of the plurality of optical waveguides;
a second inlet to a second receiving region of the plurality of optical waveguides, wherein the second inlet is offset a first amount with respect to the first inlet in a first direction approximately perpendicular to lines of the grating;
a third inlet to a third receiving region of the plurality of optical waveguides, wherein a first portion of the grating located adjacent to the first inlet has a different periodicity than a second portion of the grating located adjacent to the third inlet; and
 a plurality of pixels formed on the substrate, each including a reaction chamber configured to receive a sample for genetic or protein sequencing, detection and/or measurement;
wherein the waveguides are configured to provide excitation radiation to the reaction chambers; and
 wherein each waveguide of the plurality of optical waveguides comprises a first dielectric material embedded within a second dielectric material having a lower index of refraction than the first dielectric material.

* * * * *